United States Patent
Nandyal

(10) Patent No.: US 10,841,411 B1
(45) Date of Patent: Nov. 17, 2020

(54) SYSTEMS AND METHODS FOR ESTABLISHING A COMMUNICATIONS SESSION

(71) Applicant: Amazon Technologies, Inc., Seattle, WA (US)

(72) Inventor: Aparna Nandyal, Tamil Nadu (IN)

(73) Assignee: Amazon Technologies, Inc., Seattle, WA (US)

(*) Notice: Subject to any disclaimer, the term of this patent is extended or adjusted under 35 U.S.C. 154(b) by 178 days.

(21) Appl. No.: 15/808,309

(22) Filed: Nov. 9, 2017

(51) Int. Cl.
*H04M 1/253* (2006.01)
*H04M 7/00* (2006.01)
*H04L 29/06* (2006.01)

(52) U.S. Cl.
CPC ...... *H04M 1/2535* (2013.01); *H04L 65/1006* (2013.01); *H04M 7/006* (2013.01); *H04L 29/06387* (2013.01); *H04M 2207/185* (2013.01)

(58) Field of Classification Search
CPC ............... H04M 1/2535; H04M 7/006; H04M 2207/185; H04M 1/271; H04M 2250/74; H04M 3/53333; H04M 3/53366; H04M 1/605; H04L 65/1006; H04L 29/06387
See application file for complete search history.

(56) References Cited

U.S. PATENT DOCUMENTS

| | | | | |
|---|---|---|---|---|
| 9,754,582 B2* | 9/2017 | Plumb | ..................... | G10L 15/08 |
| 10,311,877 B2* | 6/2019 | Lee | .......................... | G10L 15/08 |
| 2009/0319521 A1* | 12/2009 | Groeneveld | .......... | G06F 16/951 |
| 2012/0278076 A1* | 11/2012 | Lloyd | ..................... | G10L 15/22 |
| | | | | 704/240 |
| 2013/0125019 A1* | 5/2013 | Vymenets | ............... | G06F 40/10 |
| | | | | 715/752 |
| 2013/0231917 A1* | 9/2013 | Naik | ....................... | G10L 13/08 |
| | | | | 704/9 |
| 2014/0163994 A1* | 6/2014 | Lau | ........................ | H04M 1/271 |
| | | | | 704/275 |
| 2019/0114372 A1* | 4/2019 | Southgate | ............. | G06F 16/215 |

* cited by examiner

Primary Examiner — Akelaw Teshale
(74) Attorney, Agent, or Firm — Pierce Atwood LLP

(57) ABSTRACT

Systems, methods, and devices for establishing communications sessions with contacts are disclosed. In some embodiments, a first request may be received from a first device. The first request may be to communicate with a contact name. A user account associated with the first device may then be identified, and a contact list associated with the user account may be accessed to determine contacts associated with the contact name. Based on the contact list, a first contact and a second contact associated with the contact name may be identified. It may be determined, from memory, that the first contact is a first preferred contact. However, based on an intervening event, the second contact, rather than the preferred contact, may be selected for communicating with the contact.

22 Claims, 9 Drawing Sheets

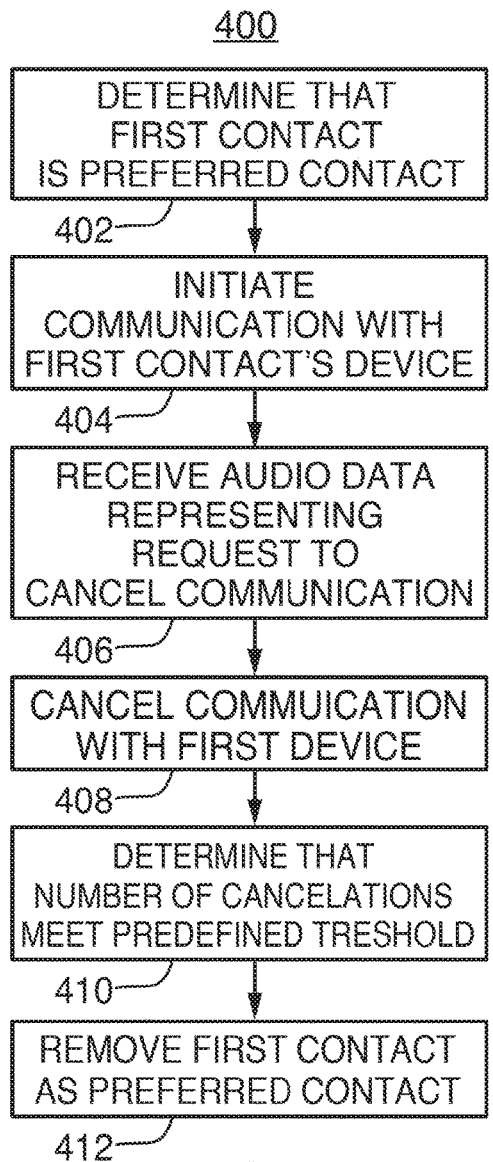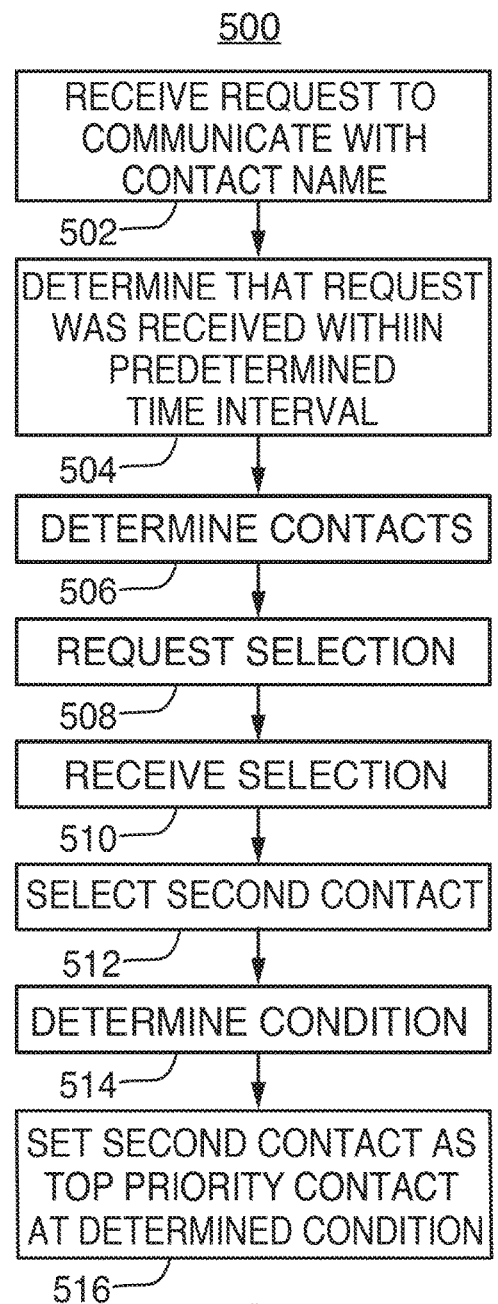
FIG. 4
FIG. 5

SYSTEMS AND METHODS FOR ESTABLISHING A COMMUNICATIONS SESSION

BACKGROUND

Electronic devices, such as audio (e.g., voice) controlled electronic devices, are capable of performing various functions. For instance, an individual may speak a command to such a device, and in response, a communication may be sent from the device to another device. Some audio-controlled electronic devices may also include display screens capable of outputting content.

BRIEF DESCRIPTION OF THE DRAWINGS

FIG. 4 is a process for sending a communication to a target device, in accordance with various embodiments;

FIG. 5 is a process for sending a communication to a target device, in accordance with various embodiments.

DETAILED DESCRIPTION

Figure 1A:
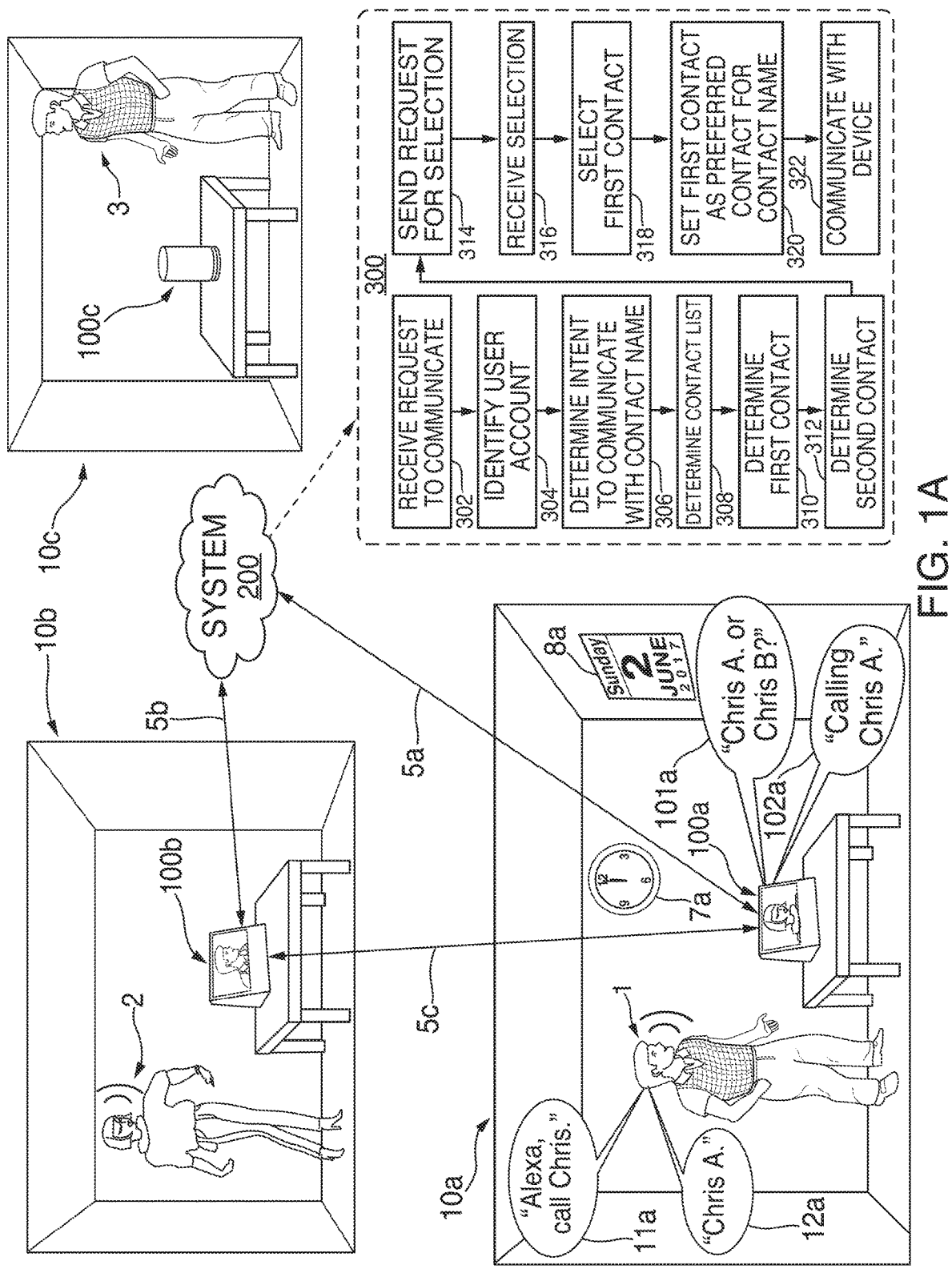
FIGS. 1A-1D are illustrative diagrams of an exemplary system for establishing a communications session between an initiating device and a target device, in accordance with various embodiments.

The present disclosure, as set forth above, is generally directed to various embodiments of systems, methods, and devices related to allowing users to communicate with one another using voice-controlled devices. Devices such as Amazon's Echo are increasingly used by individuals for, among other things, communicating with friends, family, and associates, much like traditional land-line telephones have been used in earlier times. However, instead of requiring users to dial a numerical code associated with the individuals' intended recipients, voice-controlled devices allow individuals to utter the name and/or location of their intended recipients, potentially even specifying a particular communication mode to use (e.g., by specifying a particular third party messaging service). Unfortunately, however, such utterances may lead to ambiguities when more than one contact or device appears to be the likely intended recipient, resulting in potential failures by the system architecture to open the proper communication session. For instance, a user may speak the utterance, "Call Chris" to a voice-controlled device while sitting in his or her bedroom. The user may have a user account associated with the voice-controlled device, and the user account may have multiple contacts associated with that user account that are stored under the contact name "Chris." Additionally, a contact may have multiple communication modes enabled through which the contact may be capable of communicating. In some situations it may be necessary to determine a specific communication mode for communicating with a contact. However, rather than make this selection every time an individual wishes to communicate with the contact, it may be preferable to simply store these selections, as well of various characteristics of the individual's contacts, in memory. Accordingly, improved systems, methods, and devices are described herein for disambiguating between contact names, storing those disambiguation selections and various characteristics of contacts, and adjust the stored selections based on actual usage by the individuals and changing characteristics (such as, for example, by automatically deleting data indicating selection, when appropriate).

In some embodiments, a system may store data representing a user's selection from multiple options that match a given contact name. For instance, an individual may wish to initiate a communication with a specific contact named "Chris A." Thus, the individual may say, "Alexa, call Chris" and a voice-controlled device may receive the audio signal generated by the individual's utterance. The device may then send audio data representing the utterance to the system, which performs automatic speech recognition (ASR) processing to determine, based on the audio data, what words were uttered by the individual. The system may then utilize natural language understanding (NLU) processing to determine that the intended meaning of the spoken words represent an intent to communicate with a contact name. The contact name may represent one or more contacts stored in memory as being associated with a user account that may or may not also be associated with the voice-controlled device.

In some embodiments, based on this intent, the system may search a database for contacts and determine that multiple contacts match the contact name "Chris," such as, for instance, a contact "Chris A." and a contact "Chris B." Due to the fact that multiple contacts match the contact name, the system may generate a prompt for the voice-controlled device to output, which requests that the individual makes a selection between "Chris A." and "Chris B." Once the system receives audio data representing the selection, the system may then store data indicating the selected contact is a preferred contact under those circumstances and between those contacts. For instance, if the individual selects "Chris A.," the system will store data indicating the selection of "Chris A" instead of Chris B. This selection will also be stored with related metadata, such as time of day, device location, device ID that received the utterance, individual's profile identifier, etc. (which may be referred to herein as "characteristics."). If the individual later says, "Alexa, call Chris," or if the system otherwise determines that a user's intent is to communicate with the contact name "Chris," then "Chris A.," now being stored as the preferred contact with respect to contact name "Chris," will be selected for communication. In some embodiments, characteristics can be leveraged and the preferred contact can be selected only when there are characteristics suggesting the preferred contact should be chosen (e.g., same location and device as last time Chris A. was indicated as preferred by the individual).

In some embodiments, preferred contacts may be stored for all user profiles in a user account. However, in some embodiments, preferred contacts may additionally, or alternatively, be stored as contact information corresponding to contacts assigned to different user profiles associated with a particular user account (e.g., user profile within a particular user account that may be determined by a speaker identification system, which will be discussed in further detail below). In some embodiments, where a primary user does not have a contact that matches a particular contact name, but other users utilizing the user account collectively have multiple contacts that match the contact name, a system may designate a particular contact as a preferred household contact, for instance if the system determines that the primary user (or another user who does not have the contact name stored as a personal contact) is requesting the communication with the contact name. In some embodiments, however, where a user does have a personal contact assigned to his/her corresponding user account that matches the contact name, that personal contact may be selected as the target contact rather than the preferred contact.

In some embodiments, an individual may choose to no longer associate a particular contact as the preferred contact with respect to a given contact name. Accordingly, it may be necessary for a system to delete such designation. For instance, continuing the example of the previous paragraph, upon selecting "Chris A." for communication due to "Chris A." being the preferred contact, an individual may wish not to communicate with "Chris A." Accordingly, the system may provide a period of time during which a user may cancel the communication. This period of time may not be provided or may be longer than when an inference is not made by the system based on a past user interaction. For instance, upon selecting "Chris A.," the system may cause the voice-controlled device to output information indicating that a communication to "Chris A." is being sent. The system may then delay the communication for a predetermined time interval, during which the voice-controlled device may be waiting to receive an audio signal from the individual indicating a request to cancel the communication. If the device does not receive such an audio signal within the predetermined time interval, then the communication may be sent. This information may be stored such that where the system selects "Chris A." for communicating with the contact name "Chris," rather than waste a user's time with unnecessarily delaying the communication based on a potential request to cancel (i.e., the system has never been wrong with respect to the user's desired contact for communicating with the contact name, so rather than waste the user's time with extended time intervals for the user to indicate that the system was wrong, the system will determine that the lack of requests to cancel indicate a high confidence with respect to the selection of the contact "Chris A." for communicating with the contact name "Chris."). If, however, the device does receive the audio signal within the predetermined time interval, then the attempt to send the communication may be canceled. This information may also be stored, such that where the system selects "Chris A." for communicating with the contact name "Chris," the predetermined time interval may be extended to ensure that the user is given enough time to request a cancelation of an attempt to communicate with "Chris" (i.e., the system knows, based on user interaction with respect to the contact name, that the system has previously selected a contact that the user ultimately did not wish to communicate with, and thus provides extra time for a user to let the system know that it has made such a mistake again). In some embodiments, if a characteristic of the preferred contact includes a predetermined number of similar such requests to cancel communications with respect to the contact "Chris A." having been made, the contact "Chris A." may no longer be stored as the preferred contact with respect to the contact name "Chris."

In some embodiments, an intervening event may cause a contact other than the preferred contact to be selected for communication. For instance, upon determining that an intent is to communicate with a contact name, a system may search for contact profiles associated with the contact name. Each contact profile may contain information regarding various characteristics of the contact, such as name, date of birth, whether the contact is a preferred contact (and, if so, the particular contact name(s) and/or other circumstances under which the contact is a preferred contact), relationship to the particular speaker of the utterance, and any other information associated with the respective contact.

In some embodiments, it may take multiple instances in which an individual requests to cancel a communication with a contact before that contact is deleted from its designation as the preferred contact. For instance, a system may require three consecutive cancelations before ultimately deleting a contact from its designation as the preferred contact. This may allow additional characteristics to be determined. For instance, continuing the example discussed above, "Chris A.," whom the individual communicates with daily, may be the preferred contact with respect to the contact name "Chris," but at 2:00 PM on Saturdays, the user may consistently request that communications with respect to "Chris A." be canceled. Within a predefined period of time after the cancelation, a communication with "Chris B." may be sent instead. Accordingly, the system may determine that a characteristic of a contact may be that the user specifically selects "Chris B." for communicationg at 2:00 PM on Saturdays, and thus an intervening event may be that the characteristic matches the current day of the week being Saturday and the time being 2:00 PM (or 14:00 according to a 24-hour clock). Another example of an intervening event may be that the individual has recently added a new contact that matches the contact name (thus, a characteristic of the new contact is that the new contact was recently added at a given date and time). For instance, if a user has added a contact that matches the contact name within the past ten minutes, then the system may determine that the intended recipient of the communication is the recently added contact, rather than the preferred contact whom the individual generally attempts to contact.

FIG. 1A is an illustrative diagram of an exemplary system for establishing a communications session between an initiating device and a target device, in accordance with various embodiments. In a non-limiting embodiment illustrated in FIG. 1A, an individual 1 may have two acquaintances, individual 2 (who may be located in a remote location 10b that may include an electronic device 100b) and individual 3 (who may be located in a remote location 10c that may include an electronic device 100c). Individual 1 may wish to communicate with one of the acquaintances using a voice-controlled electronic device 100a. Accordingly, individual 1 may speak utterance 11a, stating "Alexa, call Chris." The term "Alexa" may correspond to a wakeword (as will be discussed in greater detail below) that, when received by one or more microphones installed in device 100a, is determined to be a signal that causes device 100a to continue receiving and begin recording the remainder of utterance 11a.

In some embodiments, upon receiving an audio signal emitted by utterance 11a, device 100a may generate audio data representing utterance 11a and transmit that data via channel 5a to a speech processing system 200, which may identify a user account associated with device 100a and perform a series of operations in order to determine and process an intent of utterance 11a. For instance, as will be shown in greater detail in FIGS. 3-6, the operations may include using ASR and NLU processing to determine that an intent of utterance 11a may be to communicate with a contact that may be referred to using the contact name "Chris." System 200 may then access a list of contacts associated with the user account to determine what, if any, contacts match the contact name "Chris." In an exemplary, non-limiting embodiment, system 200 may determine that multiple (e.g., two, as illustrated by an embodiment of FIG. 1A) contacts match, or are otherwise associated with, the contact name "Chris:" "Chris A." and "Chris B." Accordingly, as illustrated in FIG. 1A, system 200 may determine that a selection must be made in order to disambiguate the two contacts.

In some embodiments, in order to resolve this need for disambiguation, system 200 may generate and forward audio data to device 100a to output, such that device 100a presents output 101a representing the inquiry "Chris A. or Chris B.?" Device 100a then waits for a response, which is to be received by the one or more microphones installed in device 100a. Upon hearing the output from device 100a, individual 1 may respond with an utterance 12a representing the selection of "Chris A." Device 100a may then receive the audio signal emitted by utterance 12a, generate audio data representing utterance 12a, and forward that audio data to system 200 to further process individual's intent to communicate.

System 200, upon receiving the audio data representing utterance 12a from device 100a, may then select the contact of contact "Chris A." from the contact list based on the selection by individual 1. Based on this selection, system 200 may communicate with device 100b via channels 5a and 5b to establish communications between device 100a and device 100b, which may be a device associated with contact "Chris A." In some embodiments, system 200 may establish communications by causing device 100a to directly send a communication to device 100b via channel 5c. The communication sent by device 100a to device 100b may be a request to establish a synchronous communications session, data necessary to automatically establish a synchronous communications session, one or more data packets representing a message uttered by individual 1, or any other communication that may be made between devices.

In some embodiments, in addition to establishing communications between device 100a and device 100b, system 200 may also perform one or more processes to store the selection such that future attempts to communicate with the contact name "Chris" do not require an individual needing to further specify an intended recipient associated with that contact name. For instance, system 200 may set the selected contact as a preferred contact with respect to the contact name and store this setting in memory. In some embodiments, system 200 may record additional information (i.e., metadata, characteristics each contact, etc.) that may be useful for further processing, including, but not limited to, the date that utterance 11a (or, alternatively, any particular utterance) was received by device 100a and/or system 200, the time of day that utterance 11a was received by device 100a and/or system 200, the day of the week (e.g., Saturday, Sunday, Monday, etc.) that utterance 11a was received by device 100a and/or system 200, whether a different contact was previously stored as the preferred contact for the contact name, other contacts listed as search results corresponding to the original inquiry of contacts associated with the contact name in response to the intent to communicate with the contact name.

Figure 1B:
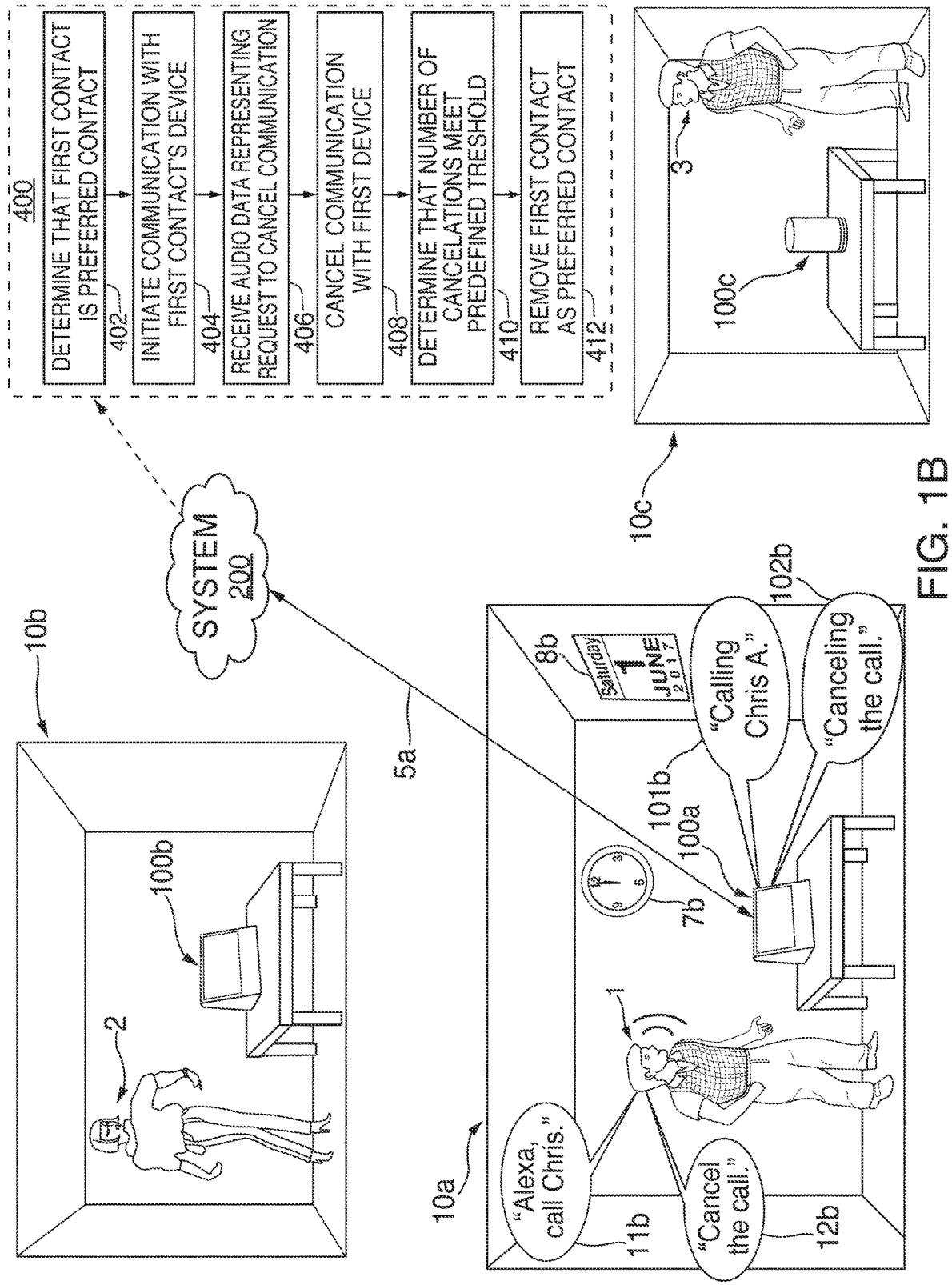

FIG. 1B is another illustrative diagram of an exemplary system for establishing a communications session between an initiating device and a target device, in accordance with various embodiments. In an exemplary, non-limiting embodiment as illustrated in FIG. 1B, an individual 1 may find it desirable to contact someone other than a preferred contact for a given contact name. In some embodiments, it may also be preferable to cancel storing the preferred contact altogether. Accordingly, in an exemplary, non-limiting embodiment as illustrated in FIG. 1B, individual 1 may speak an utterance 11b that says "Alexa, call Chris." Device 100a may receive an audio signal emitted by utterance 11b and send audio data representing utterance 11b to system 200 for processing (e.g., FIG. 4, which will be discussed in further detail below). System 200 may then use ASR and NLU processing to determine that the intent of utterance 11b is to communicate with contact name "Chris." System 200 may then access a list of contacts associated with the contact name.

In some embodiments, along with each contact from the list of contacts, information for each contact may additionally be retrieved. Such information may indicate, for instance, that a particular contact is a preferred contact with respect to the contact name "Chris." Thus, in an exemplary, non-limiting embodiment as illustrated in FIG. 1B, a contact labeled "Chris A." may be stored as the preferred contact with respect to contact name "Chris." Accordingly, rather than generate a request that a user/individual make a selection of a particular contact, system 200 may automatically select "Chris A." based on the status of "Chris A." as a preferred contact. Accordingly, system 200 may begin sending a communication to a device associated with the contact "Chris A." and generate audio data for device 100a to output such that device 100a outputs audio representing the statement 101b "Calling Chris A."

In some embodiments, individual 1 may not have intended to engage in any communication with the preferred contact. Accordingly, while outputting statement 101b and attempting a send a communication to device 100b, device 100a may be "listening" via the one or more microphones installed on device 100a. As such, individual may speak utterance 12b saying "Cancel the call." Device 100a may receive an audio signal emitted by utterance 12b, generate audio data representing utterance 12b and send the audio data to system 200. System 200 may then determine that the user (i.e., individual 1) has requested to cancel the attempted communication, and accordingly cease the process of communicating with device 100b.

In some embodiments, this may not be the first time that a user has had to cancel an attempt to communicate with a contact. Thus in some embodiments, it may be desirable to delete the association of that contact as a preferred contact so that the user may establish a new preferred contact. As such, in some embodiments, upon receiving a request to cancel sending a communication to device 100b, system 200 may determine that the amount of times that a user has requested a cancelation meets a predefined threshold. For example, a predefined threshold may be that three consecutive attempts to communicate with a target that is designated as a preferred contact for a contact name are canceled by a user. As another example, those three consecutive cancelations may only be counted toward the threshold if there is an intervening event necessitating the cancelation is not established or otherwise determined (as will be described in further detail below). Once the number of cancelations has met the predefined threshold, the association of the contact in question as a preferred contact for the particular contact name may be deleted.

In some embodiments, however, rather than deleting the association of a contact as a preferred contact for a particular contact name, a different contact may be set as a preferred contact for the contact name under a particular condition. For instance, if individual 1 communicates with individual 2 on a daily basis, but also communicates with individual 3 every Saturday, the occurrence of a request by individual 1 to communicate with a contact name associated with individuals 2 and 3 on a Saturday may be an intervening event. As such, whenever individual 1 attempts to communicate with a contact name, characteristics of contacts associated with the contact name (e.g., contacts profiles representing individuals 2 and 3) may be determined and used to determine which contact to communicate with. For instance, on Saturdays (and possibly, in some embodiments, at a particular time of the day on Saturdays), rather than communicating with individual 2 as the preferred contact, system 200 may select individual 3 as the preferred contact due to the characteristic that individual 3 is the most appropriate contact for communicating with the contact name on Saturdays, as well as the intervening event that the request to communicate with the contact name is being made on a Saturday. Thus, it may be desirable to establish intervening events to determine when to deviate from selecting a preferred contact for a particular contact name, rather than deleting the association of the preferred contact name altogether.

Figure 1C:
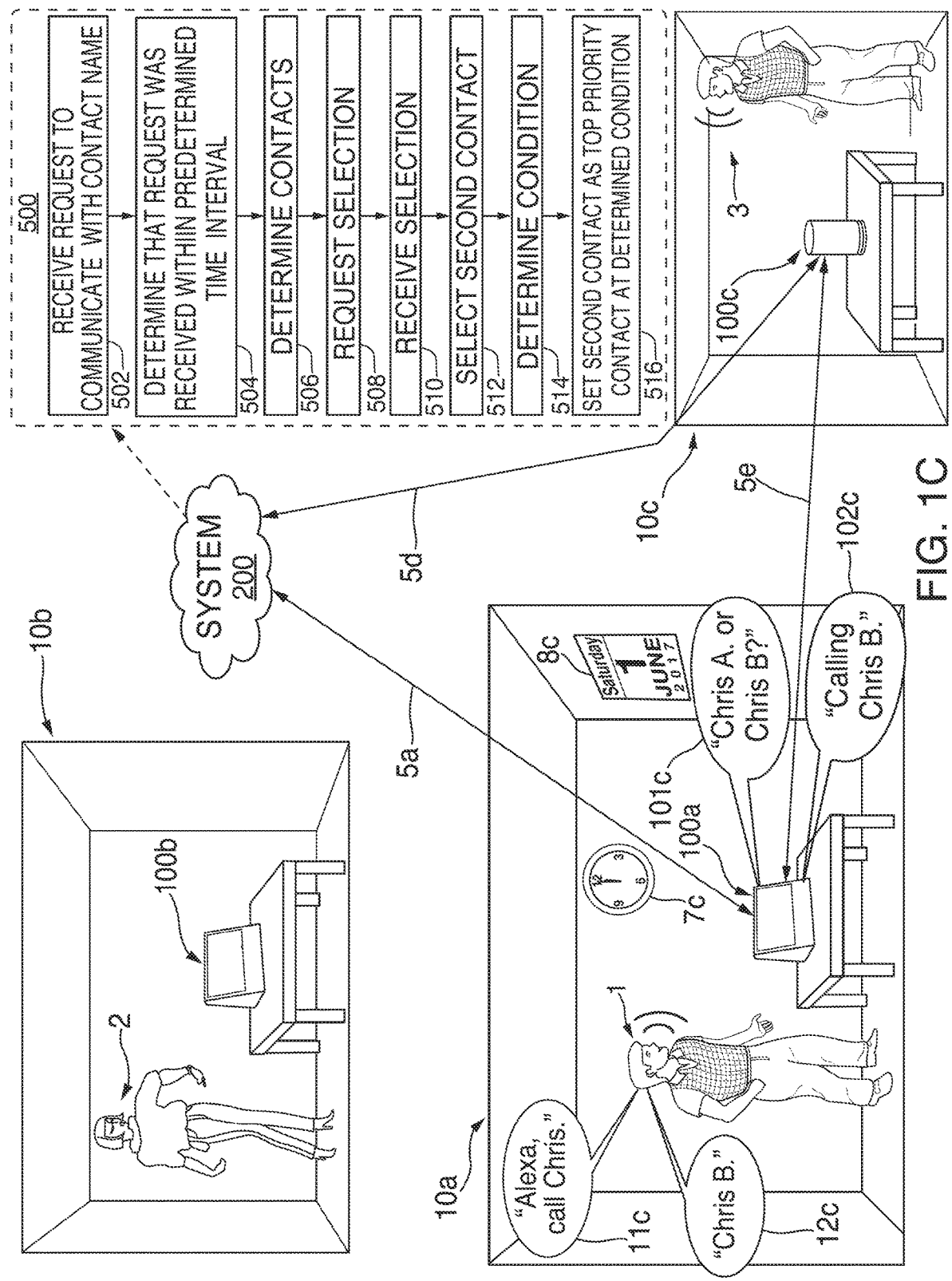

FIG. 1C is another illustrative diagram of an exemplary system for establishing a communications session between an initiating device and a target device, in accordance with various embodiments. As stated above, it may be desirable to establish intervening events. Accordingly, in an exemplary, non-limiting embodiment illustrated in FIG. 1C, individual 1 may speak utterance 11c stating "Alexa, call Chris." Upon receiving audio data representing utterance 11c, system 200 may determine that utterance 11c includes a request to communicate with a contact name "Chris," and that the request was received within a predetermined time interval. A predetermined time interval may be, for instance, five minutes after receiving an earlier request to communicate with the contact name (which ultimately resulted in another request to cancel sending a communication to a preferred contact). System 200 may then access a contacts list associated with a user account that itself is associated with device 100a. Upon determining that multiple contacts are associated with contact name "Chris," similar to the system of FIGS. 1A and 1B, system 200 may generate and forward to device 100a audio data representing a request for a selection between contacts "Chris A." and "Chris B." In some embodiments, upon receiving a selection from individual 1, such as utterance 12c selecting "Chris B.," system 200 may send a communication to device 100c via channel 5d such that it establishes a communications session between device 100a and device 100c via channel 5e. Rather than establish the contact "Chris B.' as the preferred contact generally for contact name "Chris," system 200 may further determine one or more specific characteristics about the contacts, which may relate to the request to communicate with contact "Chris B." (e.g., when utterance 11c was received, when an initial utterance to communicate that ultimately led to a cancelation was received, etc.). In some embodiments, rather than go through the entire process of requesting and receiving a selection from individual 1, system 200 may simply recall that only two contacts were identified as possibly matching the contact name, and based on the request being received within the predetermined time interval, system 200 may simply select "Chris B." due to the fact that the previous cancelation may have rendered it unlikely that the individual intended to communicate with "Chris A." within the predetermined time interval. System 200 may then, based on the one or more specific characteristics, set the selected contact "Chris B." as a top priority contact when the determined one or more characteristics matches the circumstances at the time the request is being made.

Figure 1D:
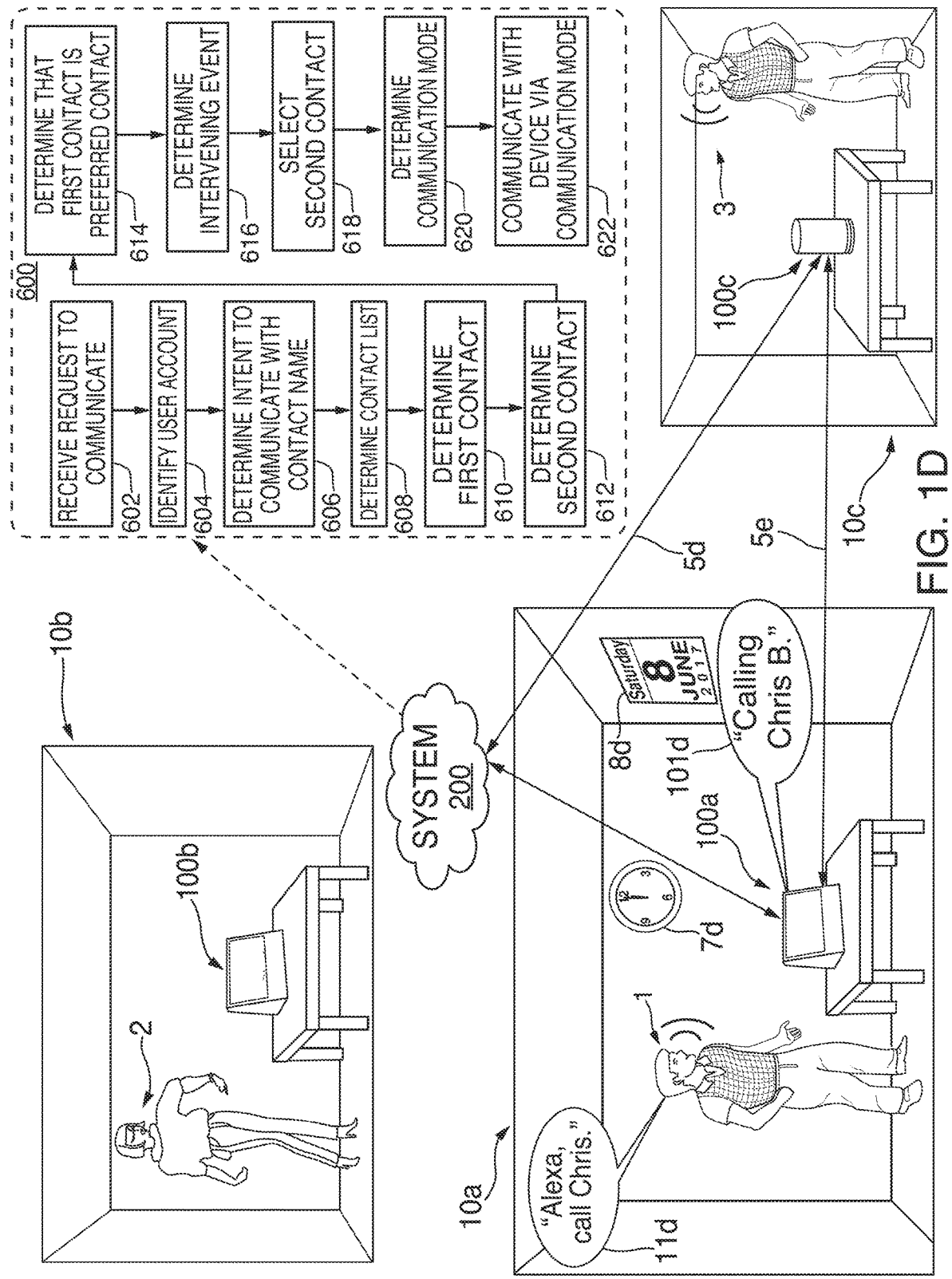

FIG. 1D is another illustrative diagram of an exemplary system for establishing a communications session between an initiating device and a target device, in accordance with various embodiments. In an exemplary, non-limiting embodiment as illustrated in FIG. 1D, a preferred contact is stored in memory in system 200, and an intervening event is also stored in memory in system 200. Accordingly, individual 1 may speak an utterance 11d saying "Alexa, call Chris." Device 100a may transmit audio data representing utterance 11d to system 200, which would then determine a user account associated with device 100a, and access a list of contacts associated with the user account. Of the contacts associated with the contact name "Chris," system 200 may determine that the contact "Chris A." is still the preferred contact. However, as stated above, additional characteristics may be retrieved relating to each contact may be determined, including as instructions that the contact should be ranked as a top priority contact if characteristics match the specific circumstances (e.g., that "Chris B." is a top priority contact on Saturday afternoons, and the request to communicate with the contact name is being made on a Saturday afternoon, as illustrated by clock 7d and calendar 8d). In some embodiments, the condition may be met. Accordingly, system 200 may determine that an intervening event has occurred. Due to the intervening event (i.e., the characteristic matching the circumstances), system 200 will choose a contact that is not the preferred contact for the contact name, which as illustrated in FIG. 1D, may be the contact "Chris B."

In some embodiments, other types of intervening events may be determined such that a contact other than a preferred contact may be selected for communication with a contact name. For instance, as stated above, other characteristics, such as birthdays, whether a contact was recently added, when a contact was recently communicated with, primary communication modes that are enabled with respect to the contact, and whether the user has an upcoming calendar event that involves the contact. Such information may be used by system 200 to determine the occurrence of an intervening event. For instance, in some embodiments, individual 1 may speak an utterance that says, "Alexa, call Chris at work." If a preferred contact does not have a communication mode (e.g., a device) designated as work, but one other contact does in fact have such a communication mode, then system 200 may determine that such an intervening event allows for the selection of that contact rather than the preferred contact. In other embodiments, an utterance may be to communicate with a contact name using a specified communications service. If a characteristic of the preferred contact is that the preferred contact lacks an ability to communicate using such a communication mode (i.e., the specified communications service), but a characteristic of another contact includes the capability to communicate using that communication mode, then system 200 may determine that such an intervening event allows for the selection of that contact rather than the preferred contact.

Figure 2A:
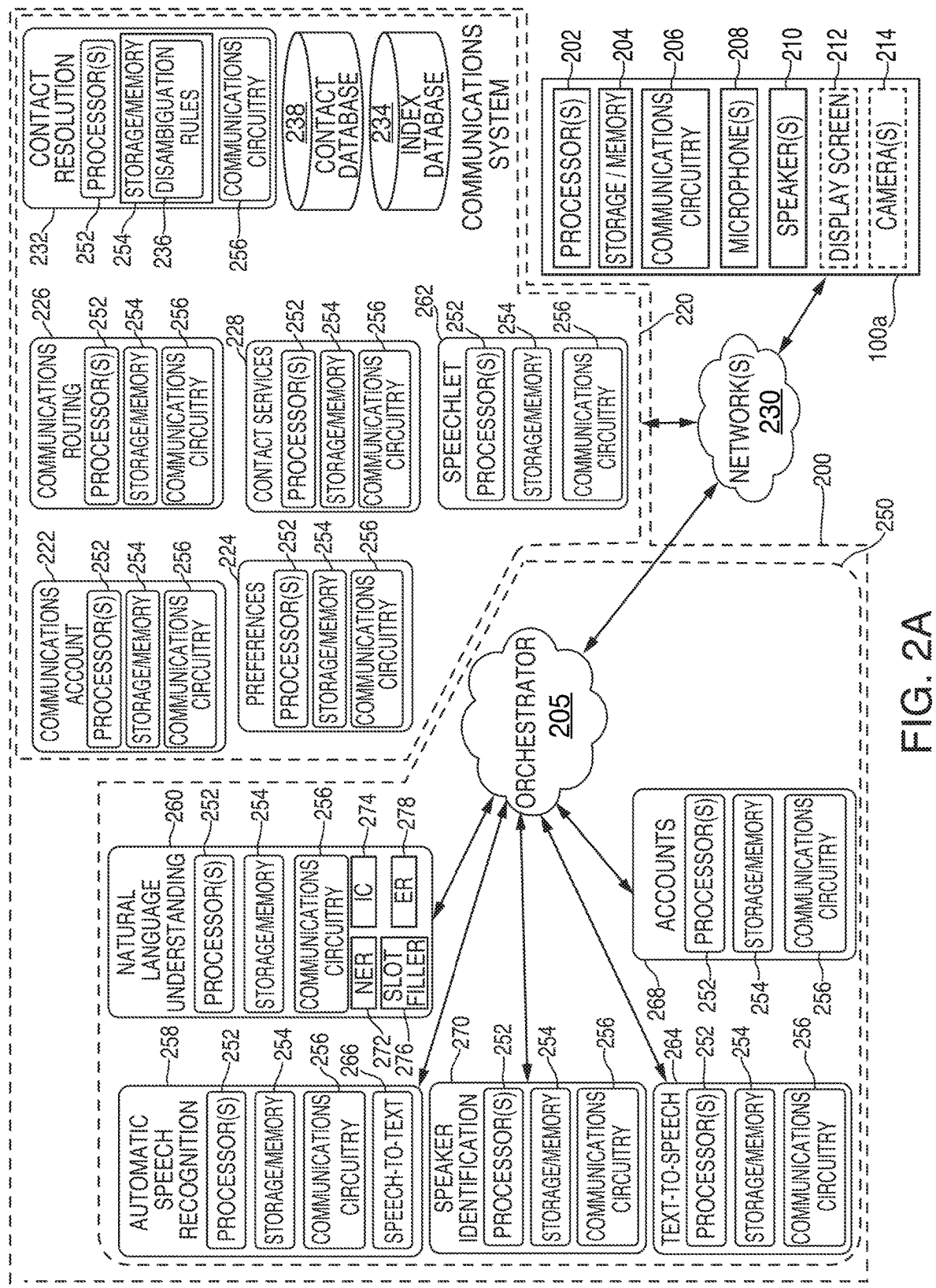
FIG. 2A is an illustrative diagram of an exemplary system architecture that can be utilized by, for example, the systems shown in FIG. 1A-1D, in accordance with various embodiments.

FIG. 2A is an illustrative diagram of an exemplary system architecture that can be utilized by, for example, the systems shown in FIGS. 1A-1D, in accordance with various embodiments. Electronic device 100a may, in some embodiments, include sound controlled functionality, such as one or more voice or sound activated components. In some embodiments, electronic device 100a may be configured such that it may communicate with computing system 200, and in particular an orchestrator of speech-processing system 250, in response to detecting an utterance that includes a wakeword, which may subsequently be followed by a request, a question, a statement, or an intent, for instance. Similarly, electronic device 100a may alternatively or additionally include one or more manually activated components for manually controlled functionality. In this particular scenario, electronic device 100a may also be configured, in some embodiments, to communicate with computing system 200, and thus speech-processing system 250, in response to a manual input being detected by one or more input mechanisms, such as a touch screen, a button, and/or a switch, for example.

In non-limiting embodiments, electronic device 100a may be capable of being activated in response to detecting a specific sound, such as a wakeword, as well as, or alternatively, via one or more inputs. After detecting a specific sound (e.g., a wakeword or trigger expression), electronic device 100a may recognize commands (e.g., audible commands, inputs, etc.) within captured audio, and may perform one or more actions in response to the received commands. Furthermore, electronic device 100a may also be configured to perform one or more actions in response to detecting a particular touch, or other mechanical inputs via electronic device 100a.

Electronic device 100a may correspond to any suitable type of electronic device including, but not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100a may be relatively simple or basic in structure such that no, or a minimal number of, mechanical input option(s) (e.g., keyboard, mouse, track pad) or touch input(s) (e.g., touch screen, buttons) are included. For example, electronic device 100a may be able to receive and output audio, and may include power, processing capabilities, storage/memory capabilities, and communication capabilities. However, in other embodiments, electronic device 100a may include one or more components for receiving mechanical inputs or touch inputs, such as a touch screen and/or one or more buttons.

Electronic device 100a, in some embodiments, may include a minimal number of input mechanisms, such as a power on/off switch such that functionality of electronic device 100a may solely or primarily be through audio input and audio output. For example, electronic device 100a may include, or be in communication with, one or more microphones that listen for a wakeword by continually monitoring local audio. In response to the wakeword being detected, electronic device 100a may establish a connection with computing system 200 and/or speech-processing system 250, send audio data to computing system 200 and/or speech-processing system 250, and await/receive a response from computing system 200 and/or speech-processing system 250. In some embodiments, however, non-voice/sound activated devices may also communicate with computing system 200 and/or speech-processing system 250 (e.g., push-to-talk devices). For example, in response to a button or touch screen being pressed, or a button or touch screen being pressed and held, a microphone associated with electronic device 100a may begin recording local audio, and may establish a connection with computing system 200 and/or speech-processing system 250, send audio data representing the captured audio to computing system 200 and/or speech-processing system 250, and await/receive a response from computing system 200 and/or speech-processing system 250.

It should be recognized that the illustrative embodiment shown in FIG. 2A shows computing system 200 to include speech-processing system 250, and communications system 220, this is merely exemplary, and speech-processing system 250 and communications system 220 may be separate, physically, logically, or both, from computing system 200. For example, speech-processing system 250 and/or communications system 220 may be located within a dedicated computing device such as one or more servers, which may or may not be in communication with computing system 200 and/or one or more additional devices.

Electronic device 100a may include one or more processors 202, storage/memory 204, communications circuitry 206, one or more microphones 208 or other audio input devices (e.g., transducers), one or more speakers 210 or other audio output devices, an optional display screen 212, and one or more optional cameras 214 or other image capturing components (the "optional" nature of those components is indicated by the dashed outline of those specific components). However, one or more additional components may be included within electronic device 100a, and/or one or more components may be omitted. For example, electronic device 100a may also include a power supply or a bus connector. As still yet another example, electronic device 100a may include one or more additional input and/or output mechanisms, such as one or more buttons, or one or more switches or knobs. As another example, electronic device 100a may lack a display screen. Furthermore, while electronic device 100a may include multiple instances of one or more components, for simplicity only one of each component has been shown.

In some embodiments, electronic device 100a may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100a may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100a may include one or more microphone(s) 208. These microphone(s) 208 may receive audio input signals, which in turn may be sent to computing system 200 and/or speech-processing system 250 in response to a wakeword engine of electronic device 100a determining that a wakeword was uttered.

Processor(s) 202 may include any suitable processing circuitry capable of controlling operations and functionality of electronic device 100a, as well as facilitating communications between various components within electronic device 100a. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 302 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100a, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100a.

Storage/memory 204 may include one or more types of storage mediums such as any volatile or non-volatile memory, or any removable or non-removable memory implemented in any suitable manner to store data for electronic device 100a. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may store one or more audible and/or visual messages to be provided to electronic device 100a for indicating that a communications session is about to end if speech is not detected. For example, storage/memory 204 may store one or more audible messages and/or GUIs that include a counter that counts down from a preset time until zero, at which point the communications session may end.

In some embodiments, storage/memory 204 may include a media system, which may be configured to facilitate communications between electronic devices 100a and computing system 200. For example, the media system may store one or more communications protocols that may be executed by processor(s) 202 for facilitating communications for device 100a. In some embodiments, a sessions initiation protocol ("SIP") may be used to facilitate media transfer between electronic device 100a and one or more of computing system 200 (e.g., communications system 220) and another electronic device 100a. SIP, for example, is an application layer protocol that is text based, and may employ Real-time Transport Protocol ("RTP") or Secure Real-time Transport Protocol ("SRTP") functions. In particular, PJSIP communications functionality may be employed by the media system to support audio, video, presence, and messaging communications for electronic device 100a. In some embodiments, a Web Real-Time Communications ("WebRTC") protocols may be employed by electronic device 100a. In a non-limiting embodiment, the media system may include instructions that indicate which communications protocols to employ for facilitating media transfer between devices based on a device type of electronic device 100a. For example, if electronic device 100a does not include display 212 and/or camera 214, then the media system may indicate that PJSIP should be used, whereas if electronic device 100a includes display 212 and/or camera 214 then the media system may indicate that WebRTC protocols should be used.

In some embodiments, storage/memory 204 may include one or more systems and/or databases, such as a speech activity detection system, a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210.

The wakeword database may be a database stored locally by storage/memory 204 of electronic device 100a, and may include a list of current wakewords for electronic device 100a, as well as one or more previously used, or alternative, wakewords electronic device 100a. In some embodiments, an individual may set or program a wakeword for their electronic device 100a. The wakeword may be programmed directly on electronic device 100a, or a wakeword or wakewords may be set by the individual via a local client application that is in communication with computing system 200 and/or speech-processing system 250. For example, an individual may use their mobile device having the speech-processing system application running thereon to set the wakeword. The specific wakeword may then be communicated from the mobile device to speech-processing system 250, which in turn may send/notify electronic device 200a of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100a. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR processing. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100a may then begin transmitting the audio signal to speech-processing system 250 for detecting and responds to subsequent utterances made by an individual.

Communications circuitry 206 may include any circuitry allowing or enabling one or more components of electronic device 100a to communicate with one another, one or more additional devices (such as, for example, devices 100b and 100c as shown in FIGS. 1A-1D), servers, and/or systems. For example, communications circuitry 206 may facilitate communications between electronic device 100a and computing system 200. As an illustrative example, audio data representing an utterance (e.g., utterance 11a of FIG. 1A) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100a and computing system 200. In some embodiments, electronic device 100a and computing system 200 and/or one or more additional devices or systems (e.g., orchestrator 205) may communicate with one another via a web browser using HTTP. Various additional communication protocols may be used to facilitate communications between electronic device 100a and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100a may include an antenna to facilitate wireless communications with a network using various wireless technologies (e.g., Wi-Fi, Bluetooth, radiofrequency, etc.). In yet another embodiment, electronic device 100a may include one or more universal serial bus ("USB") ports, one or more Ethernet or broadband ports, and/or any other type of hardwire access port so that communications circuitry 206 allows electronic device 100a to communicate with one or more communications networks.

Electronic device 100a may also include one or more microphones 208 and/or transducers. Furthermore, one or more microphones located within a separate device may be in communication with electronic device 100a to capture sounds for electronic device 100a. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100a may include multiple microphones (e.g., four, seven, ten, etc.) placed at various positions about electronic device 100a to monitor/capture any audio outputted in the environment where electronic device 100a is located. The various microphones 208 may include some microphones optimized for distant sounds, while some microphones may be optimized for sounds occurring within a close range of electronic device 100a. In some embodiments, microphone(s) 208 may only begin to detect audio signals in response to a manual input to electronic device 100a. For example, a manually activated device may begin to capture audio data using microphone(s) 208 in response to a user input, such as pressing a button, tapping a touch screen, or providing any touch input gesture to a touch input component.

Electronic device 100a may include one or more speakers 210. Furthermore, electronic device 100a may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100a may be located. In some embodiments, speaker(s) 210 may include headphones or ear buds, which may be wirelessly wired, or hard-wired, to electronic device 100a, that may be capable of broadcasting audio directly to an individual.

In some embodiments, one or more microphones 208 may serve as input devices to receive audio inputs. Electronic device 100a, in the previously mentioned embodiment, may then also include one or more speakers 210 to output audible responses. In this manner, electronic device 100a may function solely through speech or audio, without the use or need for any input mechanisms or displays, however this is merely exemplary.

Display screen 212 may correspond to a display device and/or touch screen, which may be any size and/or shape and may be located at any portion of electronic device 100a. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100a. For instance, electronic device 100a may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100a may be configured to determine which pixels are associated with a particular location point, and which item or items are also displayed at that pixel location. Furthermore, electronic device 100a may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100a, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra-high definition displays.

In some embodiments, electronic device 100a may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100a may include multiple cameras 214, such as one or more front-facing cameras and/or one or more rear facing cameras. Furthermore, camera(s) 214 may be configured to recognize far-field imagery (e.g., objects located at a large distance away from electronic device 100a) or near-filed imagery (e.g., objected located at a relatively small distance from electronic device 100a). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100a. For instance, camera(s) 214 may be external to, and in communication with, electronic device 100a. For example, an external camera may be capable of capturing images and/or video, which may then be provided to electronic device 100a for viewing and/or processing.

It may also be recognized that, in accordance with some embodiments, display screen 212 and/or camera(s) 214 may be optional for electronic device 100a. For instance, electronic device 100a may function using audio inputs and outputting audio, and therefore display screen 212 and/or camera(s) 214 may not be included. Furthermore, in some embodiments, electronic device 100a may not include display screen 212 and/or camera(s) 214, but instead may be in communication with display screen 212 and/or camera(s) 214. For example, electronic device 100a may be connected to a display screen via a Wi-Fi (e.g., 802.11 protocol) connection such that visual content sent to electronic device 100a may be sent to the display screen, and output thereby.

In one exemplary embodiment, electronic device 100a may include an additional input/output ("I/O") interface. For example, electronic device 100a may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100a may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100a. For example, one or more LED lights may be included on electronic device 100a such that, when microphone(s) 208 receives audio, the one or more LED lights become illuminated signifying that audio has been received by electronic device 100a. In some embodiments, one or more vibrating mechanisms or other haptic features may be included with electronic device 100a to provide a haptic response to an individual.

In some embodiments, electronic device 100a may include radio-frequency identification ("RFID") functionality and/or near field communication ("NFC") functionality. Furthermore, in some embodiments, electronic device 100a may include one or more infrared ("IR") sensors and one or more IR emitters. The IR sensors/emitters may be used to determine depth information. For example, in some embodiments, a distance of an individual from electronic device 100a may be determined using the one or more IR sensors/emitters. Depth determination may be performed using any depth determination technique. In some embodiments, a distance between an individual and electronic device 100a may be employed as a basis for presenting content with varying density using display screen 212. For example, when an individual is at a distance A from electronic device 100a, electronic device 100a may display weather data for a current day. However as the user moves closer to electronic device 100a, such as at a distance B from electronic device 100a, which may be less than distance A, electronic device 100a may display weather data for a current week. For instance, as the individual gets closer to electronic device 100a, the ability of the individual to see denser content increases, and as the individual moves father away from electronic device 100a, the individual's ability to see denser content decreases. This, for example, may ensure that the content displayed by electronic device 100a is continually relevant and readable by the individual.

Computing system 200, in a non-limiting, exemplary embodiment, may include speech-processing system 250. However, in other embodiments, speech-processing system 250 may be separate from, or in communication with, computing system 200. Generally, speech-processing system 250 may, in some embodiments, include one or more remote devices capable of receiving and sending content from/to one or more electronic device, such as electronic device 100a. Speech-processing system 250 may include various components and systems including, but not limited to, ASR system 258, NLU system 260, TTS system 264, and user accounts system 268. In some embodiments, speech-processing system 250 may also include computer readable media, including, but not limited to, flash memory, random access memory ("RAM"), and/or read-only memory ("ROM"). Speech-processing system 250 may also include various systems that store software, hardware, logic, instructions, and/or commands for speech-processing system 250, such as a speaker identification ("ID") system, or any other system, or any combination thereof.

Speech processing system 250, in a non-limiting, exemplary embodiment, may include orchestrator 205. Orchestrator 205 may include one or more processors and communications circuitry for communicating with the various components of speech-processing system 250 and communications system 220 (which will be described in further detail below). For instance, orchestrator 205 may be capable of receiving data and sending instructions to various systems and other components of computing system 200 to process that data. For instance, in some embodiments, orchestrator 205 may receive audio data and forward that data to ASR system 258. Upon determining that text data is generated by ASR system 258, orchestrator 205 may send instructions to ASR system 258 to forward the text data to NLU system 260. This may continue from system to system as necessary to process, for instance, intent data. Orchestrator 205 may essentially be a central processing unit capable of sending commands to each component of the systems described herein (particularly, the system of FIG. 2A) in order to process, for instance, intent data. The manner in which orchestrator 205 controls these various systems, as well as determines the specific functions to be executed by those systems, will be discussed in further detail below. Orchestrator 205 may further include memory for temporarily storing data to be processed by ASR system 258, NLU system 260, speaker identification system 270, TTS system 264, user accounts system 268, speechlet 262, and/or any other components of speech-processing system 250 and/or communications system 220.

ASR system 258 may be configured to recognize human speech in detected audio data, such as audio captured by microphone(s) 208 which may be converted to digital audio data prior to being transmitted to orchestrator 205. ASR system 258 may include, in some embodiments, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received from orchestrator 205, such as the expression detector mentioned above with regards to electronic device 100a. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase is represented within the audio signal. The expression detector may then compare that score to a threshold value to determine whether the wakeword or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and preestablished language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 250, communications system 220, or by another device, such as a separate device or server capable of performing one or more additional functionalities thereon (e.g., a television capable of outputting video content).

NLU system 260 may be configured such that it determines user intent based on the received audio data. For example, NLU system 260 may determine that the intent of utterance 11a in FIG. 1A is for initiating a communications session with another device that is associated with a particular contact (e.g., a device belonging to "Chris"). In response to determining intent data representing, or otherwise associated with, an utterance, NLU system 260 may communicate the received command to an appropriate subject matter server or functionality to perform one or more tasks, and/or retrieve an appropriate response or response information. NLU system 260 may include processor(s) 252, storage/memory 254, and communications circuitry 256 which, in some embodiments, may be substantially similar to processor(s) 202, storage/memory 204, and communications circuitry 206 of electronic device 100a, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts system 268, certain domains (e.g., music or shopping), communications account system 222 of communications system 220, and/or may be organized in a variety of other ways.

Generally, NLU system 260 receives from orchestrator 205 textual input generated by ASR system 258 and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 11*a*) as well as the pertinent pieces of information in the text that allow an action to be completed. For example, if a spoken utterance is processed by ASR system 258 and outputs the text, "call Mom," NLU system 260 may determine that an intent of the utterance is to activate a telephone, or telephone functionality, and to initiate a call with a contact represented by a contact name "Mom." In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotate text. For example, for the text "call Mom," "call" may be tagged as a command (e.g., a command to execute a phone call), and "Mom" may be tagged as a specific contact and target of the command (e.g., user account of a messaging system or a telephone number represented by the contact name "Mom," which may be stored in a contact list). Further, NLU system 260 may be used to provide answer data in response to queries, for example, using a knowledge base stored within storage/memory 254 of NLU system 260 and/or storage/memory of speech-processing system 250.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 250, communications system 220, or any other electronic device or system) may be relevant. For example, an endpoint device may offer services relating to interactions with a telephone service (e.g., communications routing system 226), a contact list service (e.g., contact services system 228), a calendar/scheduling service, a music player service, etc. As another example, an endpoint device may enable certain services or functionalities for an individual having a user account of speech-processing system 250. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272 may then attempt to identify relevant grammars and lexical information that may be used to construe meaning of the one or more results. To do so, NER system 272 may begin by identifying potential domains that may relate to the received query. NLU system 260 may include a databases of devices within storage/memory 254 of NLU system 260 that may be used to identify domains associated with specific devices. For example, electronic device 100*a* may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "communications," "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular account of accounts system 268 and/or electronic device 100*a*. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both the communications domain and the music domain, the query may, substantially in parallel, cause the natural language understanding processing may use the grammar models and lexical information for the communications domain as well as use the grammar models and lexical information for the music domain. The responses based on the query produced by each set of models is scored, with the overall highest ranked result from all applied domains being ordinarily selected to be the correct result.

An intent classification ("IC") system 274 may parse the query to determine an intent or intents for each identified domain, where the intent corresponds to the action to be performed that is responsive to the query. Each domain is associated with a database of words linked to intents. For example, a communications intent database of a communications domain may link words and phrases such as "call" to a call contact(s) intent, "hang up" to a cease communications intent, and "mute" to a mute volume intent. As another example, a communications intent database of the communications domain may link words and phrases such as "call" to a call contact intent, "message" to a message contact intent, and the like. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "call Chris" is an identified intent, a grammar framework or frameworks may correspond to sentence structures such as "Call {Contact Name}," "Call {Device Name}," "Get me {Contact Name} on the line," etc. However, to make resolution more flexible, these frameworks would ordinarily not be structured as sentences, but rather based on associating slots with grammatical tags. As another example, if "Call Chris'" is an identified intent, a grammar framework may correspond to sentence structures such as "Call {Chris}." As yet another example, if "Call 'Chris'" is an identified intent of a communications domain, a grammar framework may correspond to a sentence structure such as "Call {Contact Name}," where slot data representing the slot {Contact Name} has a value "Contact Name" associated with it.

NER system 272 may parse the query to identify words as subject, object, verb, preposition, etc., based on grammar rules and/or models, prior to resolving named entities. The identified verb may be used by IC system 274 to identify intent, which is then used by NER system 272 to identify frameworks. A framework for an intent of "call" may specify a list of slots/fields/placeholders applicable to place the identified "object" such as, for example, {Contact Name}, {Device Name}, {Entity Name}, {Application Name}, {Anaphoric Term}, {Contact Name}, {Group Account Name}, {User Account Name}, {Communications Identifier} and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Call 'Chris' at work" might be parsed and tagged as {Verb}: "Call," {Object}: "Chris," {Object Preposition}: "at," and {Object Modifier}: "work." At this point in the process, "Call" may be identified as a verb based on a word database associated with a communications domain, which IC system 276 may determine corresponds to the "call contact(s)" intent. No determination has been made as to the meaning of "Chris" and "Work," but based on grammar rules and models, it may be determined that the text of these phrases relate to the grammatical object (i.e., entity) of the query. As simpler illustrative example, a query of "Call 'Contact 1'" may be parsed and tagged as {Verb}: "Call," {Object}: "Contact 1." "Call" may be identified as a verb based on a word database associated with a communications domain, which IC system 276 may determine corresponds to a "call" intent.

The frameworks linked to the intent may then be used to determine what database fields should be searched to determine the meaning of these phrases, such as searching a user's gazette for similarity with the framework slots. So a framework for a "call contact(s)" intent might attempt to resolve the identified object for {Contact Name}, {Device Name}, {Entity Name}, {Application Name}, and {Anaphoric Term} and another framework for the same intent might attempt to resolve the object modifier based on {Contact Name}, and resolve the object based on {Device Name} and {Entity Name} linked to the identified {Contact Name}. Alternatively, the framework for a "call" intent may attempt to resolve the identified object for {Contact Name} or {Communications Identifier}. If the search of the gazetteer does not resolve a slot/field using gazetteer information, NER system 272 may search the database of generic words associated with the particular domain. So, for instance, if the query was "Call Chris at work," after failing to determine a device name or other entity name called "work," NER system 272 may search the domain for devices associated with the contact "Chris."

The results of the natural language understanding processing may be tagged to attribute meaning to the query. So, for instance, "Call Chris at work" might produce a result of: {Domain}: "Communications," {Intent}: "Call contact(s)," {Contact Name}: "Chris," and {Device Name}: "Work." As another example, "Call 'Contact 1'" might produce a result of: {Domain}: Communications, {Intent}: "Call," and {Contact Name}: "Contact 1."

The output from NLU system 260 (which may include tagged text, commands, etc.) may then be sent to an orchestrator and/or a command processor, which may be located on, or may be in communication with, speech-processing system 250. The destination command processor may be determined based on the output of NLU system 260. For example, if NLU system 260 outputs include a command to communicate with a contact, the destination command processor may be a communications application, such as one located on electronic device 100a or in a communications playing application configured to execute a command to transmit a particular audio file to another device. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application. If the output of NLU system 260 includes a request to call a contact, then the destination command processor may include a communications routing processor to initiate a communication with a particular contact's communications identifier. An identifier is a unique address associated with a contact and/or device that may be used to send and/or receive communications from the specific contact and/or device.

In some embodiments, NLU system 260 may also include an entity resolution system 278, which allows NLU system 260 to query each domain of NLU system 260 to determine which domain or domains believe that they can handle a given request. Upon performing the query, each domain may return a "score" indicating a likelihood that they can handle the application in question. For instance, various domains may return scores of LOW, MEDIUM, or HIGH, indicating the likelihood that they can handle the particular application. Entity resolution system 278 may return application/system names or titles for the request, which may be based on relevance scores that estimate a confidence that a particular application/system may be best used for the request. As an illustrative example, if the utterance is, "Call 'Contact 1'," NLU system 260 may determine, using entity resolution system 278, which domain(s), and thus application(s)/functionality or functionalities, can likely handle this request, and may select the domain and/or application/functionality having the highest confidence score as being the domain and/or application/functionality able to handle the request. NLU system 260 may further include a slot filler system 276 that can apply rules or other instructions to standardize labels or tokens from previous stages into an intent/slot representation. The precise transformation may depend on the domain. For example, a communications domain may include a text mention of "<Contact Name> home," and may be transform the text mentioned to resolved contact's name (e.g., "Contact 1"). TTS system 264 may employ various text-to-speech techniques. However, techniques for transcribing text into speech are well known in the art and need not be described in further detail herein, any suitable computer implemented text to speech technique may be used to convert the text into audio signal(s) for playback on device 100*a*, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Accounts system 268 may store one or more user accounts corresponding to users having a registered account on speech-processing system 250. For example, a parent may have a registered account on computing system 200, and each of the parent's children may have their own user account registered under the parent's registered account. In some embodiments, each user account on accounts system 268 may be associated with a particular account identifier, which may be associated with a device identifier. When a request is received by computing system 200, a device identifier indicating the device that the request was received from. The device identifier may then be mapped to an account identifier, which may indicate an account that the requesting device is registered to. In some embodiments, accounts system 268 may store voice biometric data representing voice biometric information for a specific user account. For example, acoustic features of a particular individual's voice may be stored for that individual's user account by accounts system 268. This may allow speaker identification techniques (e.g., speaker identification system 270) to be used to determine whether a generated vector corresponds to voice biometric data associated with a specific user account and/or a group account. In some embodiments, accounts system 268 may store a device identifier associated with a particular device, a communications identifier associated with a particular user account and/or group account, or any other suitable information, or any combination thereof. Accounts system 266 may also include processor(s) 252, storage/memory 254, and communications circuitry 256.

Speaker identification system 270, in some embodiments, may correspond to any suitable device/system capable of identifying a particular person's voice from an audio signal. Speaker identification system 270 may determine whether a current voice being used to speak matches known voice biometric data associated with a particular individual's voice. In some embodiments, voice biometric data may be stored within accounts system 268 for various individuals having a user account stored thereby. For example, individual 2 may have a user account on computing system 200 (e.g., stored within accounts system 268), which may be associated with electronic device 100*a*. Stored within the user account may be voice biometric data, such as stored vectors representing stored acoustic features associated with a voice of individual 1. Therefore, when an utterance, such as utterance 11*a*, is detected by electronic device 100*a*, and subsequently when audio data representing that utterance is received by computing system 200, speaker identification system 270 may determine whether the voice used to speak utterance 11*a* matches, to at least a predefined confidence threshold, the stored voice biometric information associated with individual 2 stored by their user account. If so, then this may indicate that individual 2 is the likely speaker of utterance 11*a*, and not individual 1.

In some embodiments, speaker identification system 270 may receive audio data representing an utterance, or a copy of the audio data, at a substantially same time as ASR system 258. The audio data may be divided into audio frames representing time intervals, with which a number of values or features representing characteristics of the audio data may be determined, along with a set of those values (e.g., feature vectors or audio feature vectors) representing features/characteristics of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification system 276 may also include a scoring component that determines respective confidence scores indicating how likely it is that an input utterance was spoken by a particular user.

When audio data is received by computing system 200, ASR system 258, speaker identification system 270, and/or any other suitable component of speech-processing system 250, may perform windowing functions to the audio data to generate framed audio data. The size of each audio frame may depend on a particular configuration of speech-processing system 250, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100*a*. Alternatively, feature extraction may only be performed on audio data including speech. Feature extraction and user recognition feature extraction may include determining values (i.e., features) representing characteristics of the frequency domain framed audio data, along with quantitating those features into values (i.e., acoustic feature vectors or audio feature vectors). Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 276. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification system 270 may perform speaker identification using various data including user recognition features/vector data, and training data that may correspond to sample audio data corresponding to known users associated with a particular device (e.g., electronic device 100*a*). Speaker identification system 270 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification system 270 may select the user having the greater confidence score, or may prompt the device to obtain additional information to resolve the speaker's identity.

In some embodiment, training data may be obtained and stored by user accounts system 268. The training data may be stored as waveforms and/or corresponding features/vectors, and may correspond to data from various audio samples, each audio sample associated with a known user and/or user identity. For example, each user known to the system may be associated with some set of training data for the known user. Speaker identification system 270 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by user accounts system 268 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100*a*. In this particular scenario, if an individual's device is determined to be substantially close to electronic device 100*a* at a time when the wakeword is uttered, then this may indicate that the wakeword was likely spoken by that individual. As another example, historical rules may be employed to determine a speaker of an utterance. For example, one particular individual may typically interact with electronic device 100*a*, and therefore it may be more likely that when a wakeword is detected by electronic device 100*a*, that wakeword is more likely than not spoken by that particular individual. Still further, certain individuals may be interact with electronic device 100*a* during certain times, or to perform certain functions. For example, a particular individual may typically ask for a weather forecast using electronic device 100*a* during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100*a* temporally after, and within a certain amount of time of the specific function, then this may indicate that that individual likely spoke the corresponding utterance. Persons of ordinary skill in the art will recognize that various additional techniques may be employed to determine a speaker of an utterance, and the aforementioned are merely exemplary. Speaker identification system 270 may also include processor(s) 252, storage/memory 254, and communications circuitry 256.

Additionally, in some embodiments, user accounts system 268 may store contacts associated with a particular user account and/or user profile. Further, in some embodiments, contacts stored in user accounts system may include telephone numbers (i.e., public switched telephone network ("PSTN") contacts), usernames and other information associated with third party messaging networks, and internal user accounts associated with first party messaging networks. Further still, in some embodiments, user accounts system 268 may store devices belonging to a particular user account and/or user profile.

In some embodiments, user accounts system 268 may store contact names that were assigned to represent any group of contacts. For instance, a user may collectively assign various contacts of his or her family members the entity name "Home," "Family," or any other entity name. As another example, a user may collectively assign devices belonging to his or her user account (each of which belonging to himself/herself and/or a member of his/her family) the entity name "Home," "Family," or any other entity name. As another example, user accounts system 268 may store a combination of contacts, devices, and first and/or third party messaging contacts collectively as one contact name.

Persons of ordinary skill in the art will recognize that although each of ASR system 258, NLU system 260, TTS system 264, and user accounts system 268 may each include instances of processor(s) 252, storage/memory 254, and communications circuitry 256, and those instances of processor(s) 252, storage/memory 254, and communications circuitry 256 within each of ASR system 258, NLU system 260, TTS system 264, and user accounts system 268 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Computing system 200 may also include, in a non-limiting embodiment, a communications system 220, which may be configured to facilitate communications between two or more electronic devices. For example, communications system 220 may be capable of facilitating a communications session between electronic device 100a and at least electronic devices 100b and 100c of FIGS. 1A-1D. Upon speech-processing system 250 determining, based on intent data, that an intent of an utterance is for a communications session to be established with another device, computing device 100a may access communications system 220 to facilitate the communications session between the initiating device and the receiving device. For example, communications system 220 may employ VoIP functionality to facilitate audio, video, and/or text data communications between the initiating device and the recipient device.

Communications system 220 may include, in some embodiments, speechlet 262 may, for example, correspond to various action specific systems or servers, sometimes referred to as "skills," capable of processing various task specific actions. Speechlet 262 may further correspond to first party applications and/or third party applications capable of performing various tasks or actions. For example, based on the context of the audio received from electronic device 100a, orchestrator 205 may use a certain functionality to generate a response, or to obtain response information, which in turn may be communicated back to electronic device 100a. For instance, an utterance may ask to communicate with another individual (and that individual may be associated with a user account represented by an contact name), and therefore speechlet 262 may access communications system 220 (and/or in some embodiments, third party messaging applications) to obtain contact information relating to user accounts and devices associated with or belonging to the user account associated with electronic device 100a. Speechlet 262 may also include processor(s) 252, storage/memory 254, and communications circuitry 256.

In some embodiments, an application of speechlet 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java systems.

Communications system 220, in one embodiment, may include a communications routing system 226. Communications routing system 226 may employ VoIP functionality to facilitate audio, video, and/or text data communications between the initiating device and the recipient device. In some embodiments, communications routing system 226 may allow a communications session to be established between an initiating device and a recipient device using one or more VoIP protocols including, but not limited to SIP, RTP, RTCP, SRTP, and SDP. In one illustrative embodiment, a SIP signaling command may be provided to communications routing system 226 for communicating with the recipient device. In particular, PJSIP functionality adds a new "user-to-user" header that indicates the device pair for the communications session. As an illustrative example, communications routing system 226 may route communications to a device's communications identifier in response to receiving an instruction to establish a communications session between one communications identifier and another.

In one embodiment, communications routing system 226 may include any suitable rules and/or prioritization schemes for organizing messages received for one or more user accounts and/or group accounts. For example, rules that cause messages having similar sender information to be grouped together may be included within communications routing system 226. In some embodiments, communications routing system 226 may include one or more rules to prioritize messages for playback. Such rules may include, but are not limited to, playback rules based on speaker identification, sender information, urgency of a message, vocal inflection, temporal aspects of the message, and/or content of the message. Communications routing system 226 may also include a message database, in one embodiment, capable of storing messages, or any other type of communication (e.g., telephone calls, text messages, emails, etc.). The message database may store each message that has been received with a corresponding user account or group account with which that message is directed to. Communications routing system 226 may also include processor(s) 252, storage/memory 254, and communications circuitry 256.

In one embodiment, communications system 220 may include communications accounts system 222, which may store one or more group accounts corresponding to one or more shared devices. Communications account system 222 may include a communications account database that stores communications identifiers for each group account and/or user account that is/are capable of communicating using communications system 220. For instance, a group account associated with one communications identifier may communicate with another group account associated with another communications identifier across a communications network facilitated by communications system 220.

In one embodiment, each communications account may be stored as being associated with account identifiers, linking accounts for speech-processing system 250 and communications system 220. For example, a shared device, such as shared voice activated electronic device 100a, may have its own group account stored on communications accounts system 222. The group account may be associated with the shared device, and may also be linked to one or more individual's user accounts. For example, shared electronic device 100a may be associated with a first group account corresponding to a first grouping of individual (e.g., a family). One or more user accounts may also be associated with the first group account (e.g., individual members of the family), corresponding to individuals that may be capable of interacting with shared electronic device 100a. Information, settings, and/or preferences, for example, for each user account may be stored within a user account database. In some embodiments, communications accounts system 222 and accounts system 268 may communicate with one another via network 230 to provide one another with account information associated with certain devices and communications accounts. For example, accounts system 268 may store voice biometric data for a particular user account, which may then be provided to communications accounts system 222 to determine a communications identifier and/or other communications information associated with that user account so as to allow a device associated with the user account to communicate with one or more additional devices. Communications account system 222 may also include processor(s) 252, storage/memory 254, and communications circuitry 256.

Communications system 220 may, in some embodiments, include a contact services system 228. Contact services system 228 may store contact lists, contact information, and the like, associated with one or more communications identifiers. For example, if electronic device 100a is registered to an account identifier associated with electronic device 100, and in particular to individual 1 who is a registered user of electronic device 100a, then a contact list associated with individual 1 may be accessible from contact services system 228 based on a communications identifier associated with the account identifier. In some embodiments, two or more communications identifiers may be linked together such that their contact lists may both be used to populate another contact list, such as a group account's contact list. For example, if two user accounts, corresponding to two separate users, are both associated with a same group account, then contact lists for each of the two user accounts may form the group account's contact list, which may then be associated with the account identifier. Communications system 220 may, as an illustrative example, store contact information associated with each contact of a communications identifier's corresponding contact list. For example, a contact list associated with a particular communications identifier may indicate contact identifiers for each contact of that contact list. For each contact identifier, contact information, such as, but not limited to, contact names, device names, communications identifiers, additional contacts, group accounts, telephone numbers, location information, presence information, and the like, may be stored within storage/memory 254 of contact services system 228. Contact services system 228 may also include processor(s) 252, storage/memory 254, and communications circuitry 256.

Communications system 220 may also, in one embodiment, include a preferences system. Preferences system 224 may, in one embodiment, store information associated indicating which group accounts have granted a requesting group account with permission to establish a communications session with that group account. For example, upon a new contact being added to contact management system 228, a prompt may be provided to an individual to determine whether communication session privileges are allowed for that contact such that the contact may be able to establish a communications session with the individual (or other individuals associated with the shared electronic device) without requiring the individual to "accept" or "approve" the communications session. In some embodiments, the permission may be automated such that individuals that have granted permission to certain group accounts will be automatically stored by preferences system 224. When a user requests for contacts to be displayed, preferences system 224 may be accessed to obtain a list of group accounts that have authorized a particular group account associated with the request. Preferences system 224 may then provide a supplemental list, or list metadata, that indicates which group accounts stored within the contacts list of the communications account system 222 for the requesting device have granted the permission to the requesting group account. Preferences system 224 may also include processor(s) 252, storage/memory 254, and communications circuitry 256.

Communications system 220 may also, in one embodiment, include contact resolution system 232. Contact resolution system 232 may be configured to resolve, or attempt to resolve, a particular contact from a contact list. In particular, contact resolution system 232 may be configured to resolve one contact from two or more contacts that have been identified by ER system 278 during entity resolution processing. When a user speaks an utterance, such as "Call '<Contact Name>'," "Message <Contact Name>," and the like, audio data representing the utterance may first be provided to ASR system 258. ASR system 258 may generate text data representing the audio data such that the utterance is parsed into token text strings, such as "call" and "<Contact Name>," as well as an N-best list of token hypotheses. For each hypothesis, a corresponding confidence score may be attached indicating how confident ASR system 258 is that a particular hypothesis is a particular spoken word. NLU system 260 may then identify an intent and slot of the utterance based on the text data. For example, NLU system 260 may identify the intent of the utterance "Call 'Contact 1'" as being a call intent, and may further determine that the call intent has a "Contact Name" slot associated with it. Continuing the aforementioned example, the slot may be determined to have a value "Contact 1." Thus, ER system 278 may attempt to resolve the information attributed to the slot—{Contact Name}: "Contact 1"—to a specific entity. In one embodiment, contact resolution system 232 may host its own entity resolution system, contact services ER system 234, which may reside as part contact services system 228.

Communications system 220, in one embodiment, may include a contact database 238, which may be searched for contacts that are associated with the value attributed to the contact name slot. When a contact is added to an individual's contact list, that contact's information may be stored by contact database 238 and used by Contact services ER system 234 during entity resolution processing. For instance, ER system 278 may invoke Contact services ER system 234 for searching for contacts matching the text value. A contact list may be searched for the text value "Contact 1" to identify any contacts from the contact list that substantially match the text value. In some embodiments, similar sounding words/names, double metaphones, and the like, as that of the text value may also be queried. For example, a contact named "Bob" may sound similar to a contact named "Rob," and therefore both "Bob" and "Rob" may be searched for within the contact list. As another example, a contact named "John" may also sound similar to another contact named "Jon," and therefore both "John" and "Jon" may be searched for within the contact list. The searching of the contact list within contact database 234 may result in a list of contacts—an entry within the contact list associated with a particular contact name—as well as contact identifiers associated with those contacts. Thus, ER system 278 may yield entity resolution results as contact identifiers likely corresponding to contacts of the contact list whose contact name substantially matches the input text value attributed to the contact name slot.

Contact resolution system 232 may, in one embodiment, be responsible for obtaining contacts (e.g., represented by contact identifiers) from contact services system 228. Contact services system 228 may store information (i.e., characteristics) for each of the contacts (e.g., communications identifiers, telephone numbers, birthdays, whether the contact is a preferred contact with respect to a particular contact name, etc.). If there is more than one contact identifier received by NLU system 260 (e.g., ER system 278 yields two or more contact identifiers), then disambiguation rules 236 of contact resolution system 232 may be invoked to process the contact identifiers from the entity resolution results. The various disambiguation processes included by disambiguation rules 236 may include filtering contact identifiers based on characteristics associated with the corresponding contacts, contact information associated with the contact identifiers, and/or any other suitable criteria. For example, contact identifiers are associated with contacts that had a confidence score from ASR system 258 of being less than a particular threshold (e.g., MEDIUM or LOW confidence score), may be removed from consideration. Contact identifiers that have previously been considered for contact resolution (e.g., part of a skip list) may be ignored. Furthermore, contact identifiers may be removed based on their communications information. For example, contact identifiers that are unassociated with communications identifiers of communications account system 222 may be removed from consideration. In one embodiment, contact identifiers that are determined to be ignored (e.g., not to be resolved to be the entity that the communications request is to be associated with) may also be added to a skip list. Thus, generally speaking, the goal of contact resolution system 232 is to return a single contact object (e.g., a communications identifier, telephone number, email address, etc.) to a speechlet/command processor such that the communications intent (e.g., a call intent) may be facilitated.

In some embodiments, communications system 220 may further include an index database 234. Index database 234 may store contact information obtained from contact database 238 in an indexed manner such that elastic searching, or any other type of searching, may be used to search for a particular contact. When an individual uploads contact information for a particular contact's entry, that information may be provided to both contact database 238 and index database 234. Index database 234 may parse the contact information into various categories capable of being searched using different search queries. For example, contact information associated with a first contact may include characteristics such as a first name, a last name, a group account, a telephone number, an email address, and the like. Index database 234 may parse these characteristics into each respective element. Therefore, when a query is made (e.g., get_contacts("Bob")), each of the first name, last name, group account, telephone number, and email address may be searched for the value "Bob." Persons of ordinary skill in the art will recognize that any suitable indexing technique and query term may be employed by index database 234, and the aforementioned is merely exemplary.

As an illustrative example, a communications session between two devices is briefly described below to illustrate how the communications session may be established. In an example embodiment, an individual (e.g., individual 1 of FIGS. 1A-1D) may speak an utterance (e.g., "Alexa, drop in on Chris") to their electronic device (e.g., electronic device 100a). In response to detecting the device's wakeword (e.g., "Alexa"), the electronic device may begin sending audio data representing the utterance to computing system 200, and in particular orchestrator 205, which may determine that the audio data be sent to ASR system 258 for processing. Upon receipt, ASR system 258 may perform speech recognition processing, such as STT processing, to the audio data to generate text data representing the audio data. The text data may then be passed to NLU system 260 to determine intent data representing an intent of the utterance. For example, NLU system 260 may include a listing of sample utterances to be used to disambiguate the spoken words and determine an action intended to occur for the utterance. In some embodiments, a calling speechlet system may be included within NLU system 260 that includes one or more sample utterance frameworks. If the format of the spoken utterance substantially matches one of these sample utterances, then intent data may indicate that an intent of the utterance was for a communications session to be initiated. For instance, one example sample utterance may be "{Wakeword}, {Intent: Call} {Contact Name}." If the spoken utterance's text data substantially matches this sample utterance's framework, then intent data may indicate that an intent of the utterance is to start a communications session with a contact (or device) of the user, and may also indicate that the intended target of the communications session is "Chris."

Communications system 220 may access user accounts system 268 to retrieve a list of contacts (and/or, in some embodiments, a list of contacts and/or devices) associated with the user account that are represented by a contact name that closely matches the name "Chris." In some embodiments, user accounts may return multiple contacts with labels closely matching the contact name, "Chris" (e.g., "Chris A.," "Chris B.," "Kristy," etc.). In addition to receiving each contact's label, other characteristics such as birthdays, designation as preferred contacts for any specific contact name, and other information may be retrieved from accounts system 268.

In some embodiments, communications system 220 may require a user selection to disambiguate the contacts received from accounts system 268. As such, communications system may send the potential target contacts to orchestrator 205, which may, using TTS system 264, request a selection between the potential targets from the user by sending audio data representing the request to device 100a. Upon receiving audio data from device 100a, orchestrator may then utilize ASR system 258 and/or NLU system 260 to determine which contact was selected. Accordingly, orchestrator 205 may then communicate the selection to communications system 220 to determine a recipient device associated with the selected contact in order to establish a communications session between the initiating device and an intended target device.

In some embodiments, communications system 220 may establish a communications session between the initiating device and the intended target device using the PSTN. As such, communications system may receive a telephone number from user accounts 268 and establish the communications session using the particular telephone number assigned to the contact. Persons of ordinary skill in the art will recognize that the systems and methods for establishing a communications system via PSTN and related networks are well known in the art and need not be discussed herein in greater detail.

In some embodiments, communications system 220 may establish a communications session between an initiating device and an intended target device using one or more VoIP protocols including, but not limited to SIP, RTP, RTCP, SRTP, and SDP. In one illustrative embodiment, a media system provides a SIP signaling command to communications system 220 for communicating with the media system of the intended target device. In particular, PJSIP functionality adds a new "user-to-user" head that indicates the device pair for the communications session. The recipient device receives a request to start the communications session with the initiating device, and checks to see whether or not that initiating device is authorized to establish communications sessions therewith. If not, then the recipient device's media system may generate and send an instruction to communications system 220 that causes the communications session to end. Typically this step would not occur as the initiating device may also check, prior to the recipient device receiving the request, to see if he/she is authorized to establish a communications session, however in some embodiments the check may be performed by both endpoints.

If the initiating device determines that the recipient device is authorized to establish communications session therewith, then the media system of the recipient device may send an accept call command to communications system 220, indicating that the communications session may begin. In response to receiving the accept call command, communications system 220 may send a 200 (OK) message to a SIP Proxy running on communications system 220 for facilitating the communications session. A 200 (OK) is a standard response that indicates a successful HTTP request. The SIP Proxy may act as an intermediary server/client for making requests for both the initiating device and the recipient device for routing communications to/from either device. After receiving the 200 (OK) message, the SIP Proxy may send another 200 (OK) message to the initiating device, which may acknowledges receipt using an ACK (e.g., an acknowledgement). In turn, a SIP Dialog may be established by communications system 220 for the communications session, and media systems of both the initiating device and the recipient device may connect to the SIP Dialog, and the two devices may now communicate with one another.

It may also be recognized that although each of communications account system 222, preferences system 224, communications routing system 226, and contact services system 228 may each include instances of processor(s) 252, storage/memory 254, and communications circuitry 256, and those instances of processor(s) 252, storage/memory 254, and communications circuitry 256 within each of communications account system 222, preferences system 224, communications routing system 226, and contact services system 228 may differ.

Figure 2B:
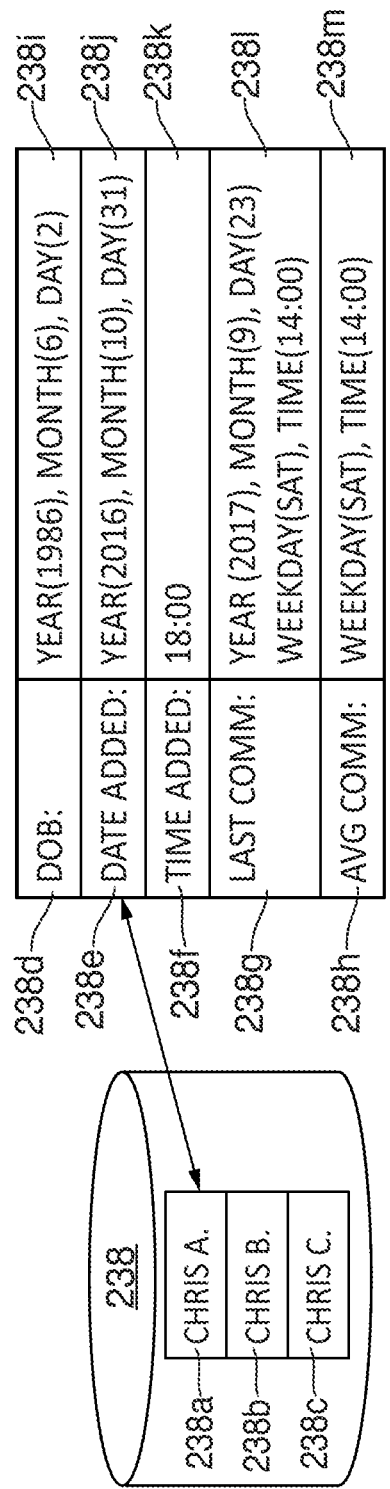
FIG. 2B is an illustrative diagram of an exemplary contact database including a data structure for storing information pertaining to a contact, in accordance with various embodiments.

FIG. 2B is an illustrative diagram of an exemplary contact database including a data structure for storing information pertaining to a contact, in accordance with various embodiments. In an exemplary, non-limiting embodiment, FIG. 2B may include contact database 238 as illustrated in FIG. 2A. Contact database 238 may include three contact profiles: "Chris A." 238*a*; "Chris B." 238*b*; and "Chris C." 238*c*. Each contact profile may be stored with certain "characteristics," which represent specific information pertaining to that contact. However, for the sake of simplicity and clarity in FIG. 2B, only the characteristics of contact profile "Chris A." are shown in FIG. 2B. Characteristics for "Chris A." may include: date of birth (i.e., DOB) 238*e*, which may be represented as "YEAR(1986), MONTH(06), DAY(02)" 238*i*; the date added 238*f* as a contact, which may be represented as "YEAR(2016), MONTH(10), DAY(31)" 238*j*; time added 238*f* as a contact, which may be represented as "18:00" 238*k*; the last date and/or time a communication was sent to "Chris A." (i.e., "LAST COMM") 238*g*, which may be represented as "YEAR(2017), MONTH(09), DAY(23), DAYOFWEEK(SAT), TIME(14:00)" 238*l*; and the average day of the week and time of the day that communications are sent to "Chris A." (i.e., "AVG COMM") 238*h*, which may be represented as "DAYOFWEEK(SAT), TIME(14:00)" 238*m*. Information may also include whether a contact profile is a preferred contact profile with respect to a given contact name.

By receiving characteristics of each contact profile, a system such as system 200 may compare the present circumstances (e.g., the current date, time, day of the week, etc.) to the characteristics to determine the occurrence of any intervening event. For instance, a characteristic of contact profile "Chris B." may indicate that "Chris B." is a preferred contact profile for contact name "Chris" (as illustrated, for instance, in FIGS. 1A-1D). However, the present circumstances, in comparison with a characteristic of "Chris A.," may indicate that the present day is a birthday for "Chris A." and therefore "Chris A." may be more likely to be the intended recipient due to this intervening event.

Figure 3:
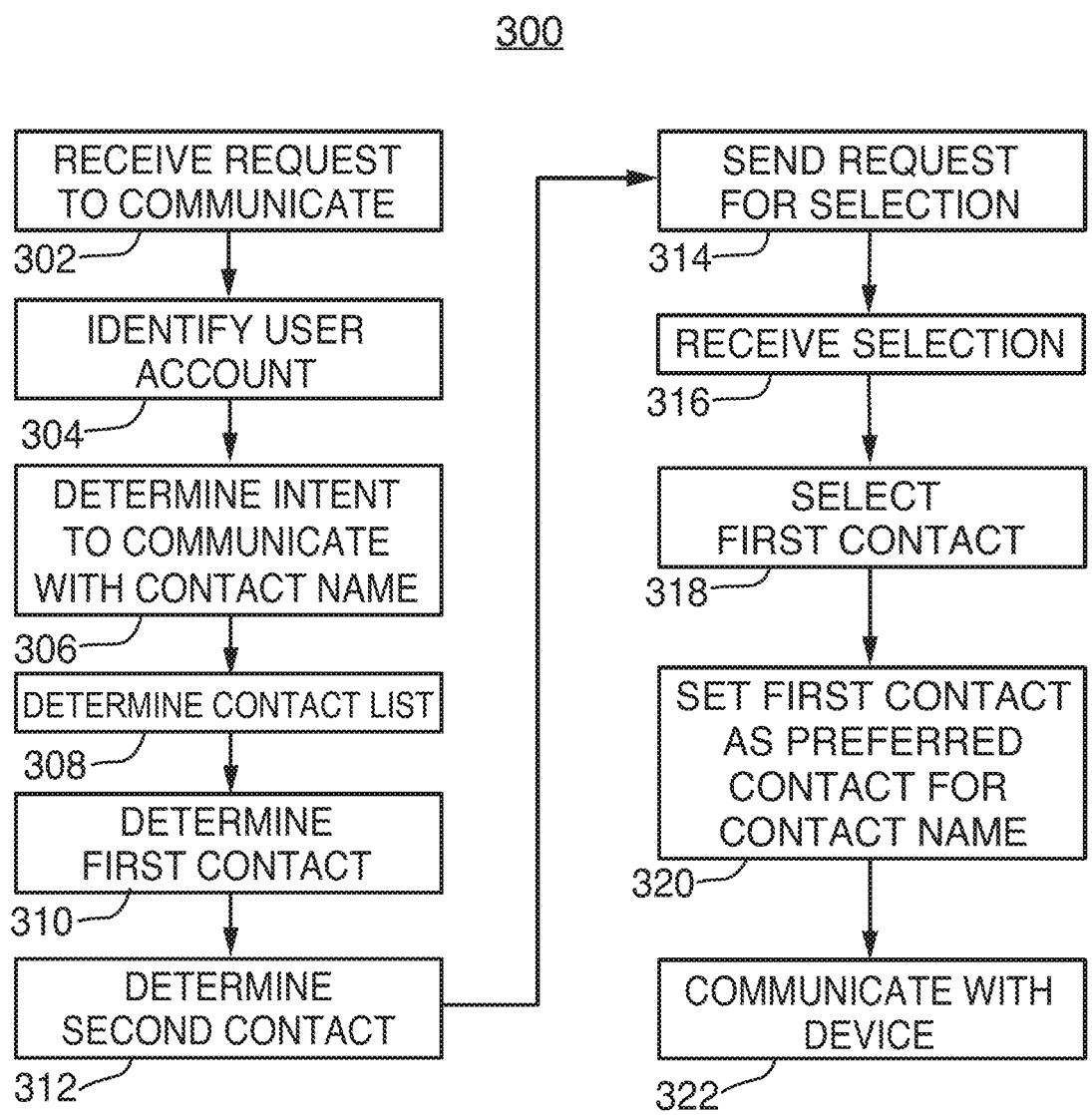
FIG. 3 is a process for sending a communication to a target device, in accordance with various embodiments.

FIG. 3 is a process for sending a communication to a target device, in accordance with various embodiments. In an exemplary, non-limiting embodiment, FIG. 3 may begin at step 302. At step 302 a request to communicate with a contact name may be received from a first device. For instance, an individual may speak an utterance saying "Alexa, call Chris." An audio signal representing the word "Alexa" may be recognized according to processing installed on a voice-activated electronic device as a wakeword. The wakeword may signal to the device to begin recording the remainder of the utterance. Once recorded, audio data representing the utterance may be generated and forwarded to, for instance, system 200, which may perform ASR and NLU processing to determine, from the audio data, that the audio data includes a request to communicate with a contact name.

At step 304, a user account associated with the device may be identified. For instance, system 200 may access accounts system 268 to determine the user account. In some embodiments, system 200 may further access speaker identification system 270 to determine a particular user within a user account stored in accounts system 268.

At step 306, an intent to communicate with a contact name (e.g., a contact name slot to be resolved) may be determined. For instance, system 200 may analyze the data corresponding to an utterance that says "Alexa, call Chris" and determine that data representing the utterance includes the slots "<Wakeword:Alexa>, <Intent:Call> <Contact Name:Chris>." System 200 may then determine that a particular content (e.g., a contact identifier) must be inserted into the contact name slot in order to process the intent. Thus, in order to resolve the contact name slot, at step 308, a contact list associated with the user account is accessed. In some embodiments, the contact list may include each contact profile, which in turn includes information pertaining to each contact. For instance, a contact profile determined from a contact list may include a date of birth associated with the contact. As another example, information pertaining to a contact profile may include whether the contact profile is a preferred contact profile.

At step 310, a first contact profile may be determined. This may be performed by system 200 accessing accounts system 268 and speaker identification system 270. At step 312, a second contact profile is determined. This also may be performed by system 200 accessing accounts system 268 and speaker identification system 270. In some embodiments, there may be no information available for use by system 200 to determine how to disambiguate between the first and second contact profile. Accordingly, system 200 must receive additional information in order to select the appropriate contact profile for communication.

Thus, at step 314, a request for a selection may be sent to the device for presentation. In some embodiments, system 200 may generate data (e.g., audio and/or visual data) and forward that data to the device for presentation. The request may be for a selection between two or more contact profiles associated with a contact name. For instance, as illustrated in FIGS. 1A and 1C, system 200 may request a selection between "Chris A." and "Chris B."

At step 316, data representing a selection may be received from the device. For instance, as illustrated in FIGS. 1A and 1C, upon being presented a request for a selection, an individual such as individual 1 may respond by speaking an utterance represented one of the determined contact profiles. For instance, an individual may speak an utterance representing a selection of "Chris A.," which may be the first contact profile. A device may then generate data representing the selection and send that data to system 200 for further processing.

At step 318, the first contact profile may be selected. Step 318 may be performed in response to receiving the selection in step 316. Upon selecting the first contact profile, at step 320, data representing a new characteristic of the first contact profile may be stored, such as data indicating an association of the first contact profile as a preferred contact profile. Finally, at step 322 a communication may be sent to a device associated with the first contact profile. As stated above, the communication may be one or more data packets representing a message, a request to establish a synchronous communications session, or any other communication.

FIG. 4 is a process for sending a communication to a target device, in accordance with various embodiments. Process 400 may be a process for deleting an association of a contact profile as a preferred contact profile. Process 400 may be a continuation of other processes, such as process 300, except that rather than having to request a selection between the first contact profile and the second contact profile, it may be determined that one of the contact profiles is a preferred contact profile. Thus, in an exemplary, non-limiting embodiment, process 400 may begin with step 402.

At step 402, it may be determined that the first contact profile is a preferred contact profile. Accordingly, the first contact profile may be selected for communication. In some embodiments, a device associated with the first contact profile may be determined. For instance, when a contact list is accessed, information pertaining to the first contact profile may include devices, communications services, and other communication modes through which the first contact profile may be communicated with.

At step 404, an attempt may be made to communicate with a target device associated with the first contact profile. For instance, upon determining a target device for communicating with the first contact profile, the first device may be sent a first communication from an initiating device and/or system 200. However, while attempting to send the communication to the contact, system 200 may also send data for the initiating device to present to the user. That data may represent an indication that the attempt to send the communication to the contact is being made. Additionally, in some embodiments, the initiating device may "listen" for any additional requests from an individual.

At step 406, audio data representing a request to cancel the communication may be received. In some embodiments, while the initiating device is "listening" for additional requests, an individual may speak an utterance that represents a request to cancel the communication with the first device. In some embodiments, the request to cancel the communication may be received through various means. For instance, in addition to (or in the alternative to) receiving audio data, an input may be received at a touch screen of an electronic device, a input may be received at a button of an electronic device, an input may be received at a companion application of a related electronic device, an input may be received at another electronic device paired with the electronic device in which the original request to communicate was received, or an input may be received in any other way that inputs are known in the art to be received. Accordingly, at step 408, in response to receiving the request to cancel the communication, the communication may be canceled.

At step 410, it may be determined that the number of cancelations meets a predefined threshold. For instance, each cancelation may be stored as a characteristic for the relevant preferred contact profile, and a predefined threshold may be three consecutive requests from a user to cancel a communication. Thus, where the three most recent requests to communicate with the contact name using the preferred contact profile have resulted in requests to cancel the communication, it may indicate that the "preferred contact profile" is no longer actually a user's preferred contact. Accordingly, in some embodiments, once this threshold is met, at step 412, the association of first contact profile as the preferred contact profile may be deleted.

FIG. 5 is a process for sending a communication to a target device, in accordance with various embodiments. In contrast to process 400 as illustrated in FIG. 4, process 500 may involve situations or circumstances in which, rather than deleting a contact profile as a preferred contact profile, contact profiles other than the preferred contact profile may be more appropriate for communication, while the preferred contact profile is still appropriate under most other circumstances. As such, in an exemplary, non-limiting embodiment, process 500 begins with step 502.

At step 502, a request to communicate with a contact name may be received. In some embodiments, a user account and/or user (i.e., speaker ID) associated with an initiating device from which the request was received may be identified. At step 504, it may be determined that the request was received within a predetermined time interval. For instance, it may be determined that the request was received by an initiating device within five minutes of a previous request to communicate with that same contact name. It may also be determined that the previous request included a preferred contact profile, and that an attempt to communicate with the preferred contact profile in response to the previous request was canceled. This may indicate, for instance, that an individual recently attempted to communicate with a contact name, but the system incorrectly attempted to communicate with a preferred contact profile, whom in this instance the individual did not wish to communicate with.

At step 506, a list of contacts associated with the user account may be accessed. In some embodiments, based on determining that the request to communicate with the contact name was received within a predetermined time interval, system 200 may fast-track the process by selecting a contact profile other than the preferred contact profile for communication. For instance, after accessing the list of contacts, it may be determined that only one other contact profile other than the preferred contact profile is associated with the contact name. Accordingly, system 200 may remove the preferred contact profile from consideration for communicating with the contact name, and instead select the other contact profile for communication. In some embodiments, however, there may be multiple other contact profiles that may be selected for communication, and system 200 may not have any way to disambiguate between those other contact profiles. Accordingly, process 500 may proceed to step 508.

At step 508, data representing a request for a selection between the contact profiles may be generated and forwarded to the device for presentation. At step 510, data representing the selection may be received. For instance, a second contact profile may be selected by an individual, who speaks an utterance representing the selection. Based on the selection of the individual (e.g., a user), at step 512, system 200 may select the second contact profile.

At step 514, a condition may be determined. The condition may be any circumstance in which the processes described herein are performed. For instance, a condition may be a date, time, and/or day of the week that a initial request to communicate with a contact name is received. For instance, a first request may be to communicate with a contact name. After attempting to communicate with a preferred contact profile, a second request to cancel the communication may be received. A third request may then be received within a predefined time interval to communicate with the contact name. A condition may relate to any of these instances, such as the date, time, and/or day of the week that the first request was received by an initiating device.

Finally, at step 516, the second contact profile may be set as the top priority contact profile at the determined one or more conditions. For instance, a characteristic of the second contact profile may be stored in memory such that the characteristic includes instructions to select the second contact profile when the request to communicate with the contact name is received at a first day of a week. In some embodiments, the occurrence of the one or more characteristics matching the present circumstances (e.g., the time interval in which the initial request to communicate with the target name was received) may be an intervening event, which will be described in greater detail in FIG. 6.

Figure 6:
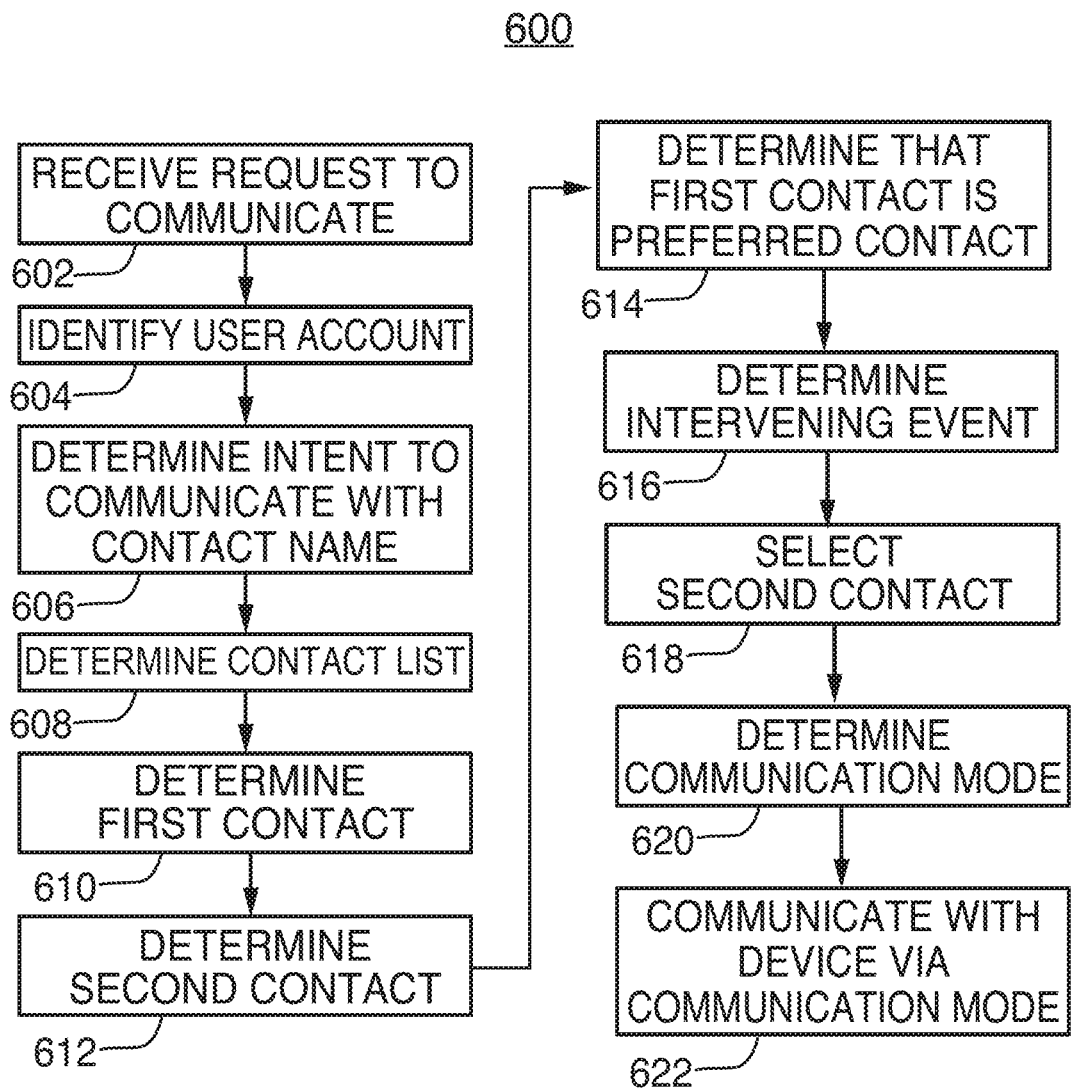
FIG. 6 is a process for sending a communication to a target device, in accordance with various embodiments.

FIG. 6 is a process for sending a communication to a target device, in accordance with various embodiments. In an exemplary, non-limiting embodiment, process 600 begins with step 602. At step 602, a request to communicate with a contact name may be received. In some embodiments, a communication mode through which to communicate with the contact name may also be specified as part of the request (e.g., a particular communications service desired by a user may be specified and determined from intent data).

At step 604, a user account associated with the user account may be identified. Additionally, or alternatively, a specific user profile (i.e., a speaker ID) may be identified. At step 606, an intent to communicate with a contact name may be determined. For instance, slot data representing a contact name slot to be resolved may be determined. In response to determining the contact name, at step 608, a contact list including contact profiles associated with the user account may be determined. As stated above, in addition to the contact profiles themselves, information such as enabled communication modes, dates of birth, etc. may be retrieved.

At step 610, a first contact profile may be determined. At step 612, a second contact profile may be determined. At steps 610 and 612, in addition to determining the first and second contact profiles, corresponding information about each contact, such as their corresponding characteristics (e.g., enabled communication modes, dates of birth, specific user profiles to which the contact is assigned, etc.) may be determined. At step 614, it may be determined, based on the characteristics of the first contact profile and the second contact profile, that the first contact profile is a preferred contact profile.

At step 616, an intervening event may be determined. In some embodiments, rather than selecting the preferred contact profile for communication, some condition may be met such that the preferred contact profile may be removed from consideration, and that a contact profile other than the preferred contact profile should be selected for communication. For instance, a characteristic of the preferred contact profile may indicate that the preferred contact profile may not be enabled or otherwise able to communicate via the communication mode specified at step 602. In some embodiments, the preferred contact profile may not be assigned to a user profile identified at step 604. For instance, a characteristic of the first (i.e., preferred) contact profile may be that it is not assigned to the particular user profile associated with the user account, while a characteristic of the second contact profile may be that the second contact profile is assigned to the user profile. Accordingly, it might make more sense to select the second contact profile rather than the first contact profile.

At step 618, based on the intervening event, the second contact profile may be selected. At step 620, a communication mode may be determined. Finally, at step 622, the second contact profile may be communicated with using the communication mode.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method comprising:
receiving, from an initiating device, first input audio data representing a first utterance received by the initiating device;
identifying a user account associated with the initiating device;
determining, from the first input audio data, first intent data representing an intent to communicate with a contact name;
determining a contact list associated with the user account;
determining, based on the contact list, a first contact profile associated with the contact name;
determining, based on the contact list, a second contact profile associated with the contact name;
determining, from memory, a first characteristic of the first contact profile, wherein the first characteristic represents that the first contact is associated as a first preferred contact for communicating with the contact name;
determining, from memory, a second characteristic of the second contact profile, wherein the second characteristic includes instructions to select the second contact profile whenever data representing the intent to communicate with the contact name is received on a first day of a week;
determining that the first input audio data was received on the first day of the week;
removing, based on determining that the first input data was received on the first day of the week, the first contact from consideration;

selecting, based on the second characteristic, the second contact;

determining a first communication mode associated with the second contact; and initiating, via the first communication mode, a communications session between the initiating device and a recipient device associated with the second contact.

2. The method of claim 1, further comprising:

receiving second input audio data representing the intent to communicate with the contact name;

determining, based on the first characteristic, that the first contact profile is the first preferred contact profile;

initiating a first communications session with the first contact;

receiving third input audio data representing a first request to cancel initiating the first communications session;

determining, from memory, that a second request to cancel a first previous attempt to initiate a second communications session with the first contact profile occurred, and that a third request to cancel a second previous request to initiate a third communications session with the first contact profile occurred; and deleting, based on the determination that the second request and the third request both occurred, an association of the first contact as the first preferred contact.

3. The method of claim 1, further comprising:

receiving second input audio data representing a first request to end the first communications session; and deleting, based on receiving the second input audio data, the association of the second characteristic from the second contact profile.

4. The method of claim 3, further comprising:

ending, based on receiving the second input audio data, the first communications session; and generating, based on the first contact profile being the first preferred contact profile, output audio data representing an offer to communicate with the first contact profile.

5. A method comprising:

receiving, by a computing system, first input data representing a first request to communicate with a contact name;

identifying a user account associated with the input data;

determining a contact list associated with the user account;

determining, based on the contact list, a first contact profile associated with the contact name;

determining a first characteristic of the first contact profile;

determining, based on the contact list, a second contact profile associated with the contact name;

determining a second characteristic of the second contact profile;

determining, based on the first characteristic, that the first contact profile is associated as a first preferred contact profile for communicating with the contact name; and selecting, by the computing system based on the second characteristic, the second contact profile.

6. The method of claim 5, further comprising:

determining a third characteristic of the first contact profile;

determining that the first request is to communicate via a first communication mode;

determining, based on the second characteristic and the third characteristic, that the first contact profile lacks a capability to communicate using the first communication mode, and that the second contact profile includes the capability to communicate using the first communication mode; and sending instructions to a first device to send the first communication from the first device to a second device associated with the second contact profile via the first communication mode.

7. The method of claim 5, further comprising:

determining a user profile associated with the user account;

determining, based on the contact list, a third contact profile associated with the contact name;

determining a third characteristic of the third contact profile;

determining a fourth characteristic of the first contact profile;

determining, based on the fourth characteristic, that the first preferred contact profile lacks an assignment with the user profile;

determining, based on the second characteristic, that the second contact profile is assigned to the user profile;

determining, based on the third characteristic, that the third contact profile is assigned to the user profile;

generating first output data representing a request for a selection between the second contact profile and the third contact profile;

sending the first output data to a first device for presentation;

receiving from the first device, second input data representing a selection of the second contact profile; and sending instructions to the first device to send a first communication to a second device associated with the second contact profile based on the selection.

8. The method of claim 5, further comprising:

selecting, prior to selecting the second contact profile, the first contact profile;

generating, based on selecting the first contact profile, first output data indicating that the first contact has been selected;

sending the first output data to a first device for presentation; and determining the occurrence of an intervening event, wherein the intervening event comprises receiving second input data representing a second request to cancel the first request.

9. The method of claim 8, further comprising:

receiving third input data representing a third request to communicate with the contact name;

determining that the third request was made within a predetermined time interval with respect to the first request;

determining the contact list; and selecting the second contact profile based on determining that the third request was made within the predetermined time interval.

10. The method of claim 8, further comprising:

determining a condition at which the first request was made; and storing, in memory, instructions to remove the first preferred contact profile from consideration for communicating with the contact name, and to select the second contact profile for communicating with the contact name whenever the condition is met.

11. The method of claim 8, further comprising;

determining that the intervening event has occurred a predefined number of times in a predefined manner; and deleting, from memory, an association of the first contact profile as the first preferred contact profile.

12. The method of claim 11, further comprising:
storing, in memory, instructions indicating that the second contact profile is a second preferred contact profile.

13. The method of claim 5, further comprising:
determining that the second characteristic satisfies a condition,
wherein selecting the second contact profile is further based at least in part on the second characteristic satisfying the condition.

14. A system comprising:
communications circuitry;
memory; and
at least one processor operable to:
receive first input data representing a first request to communicate with a contact name;
identify a user account associated with the input data;
determine, from memory, a contact list associated with the user account;
determine, based on the contact list, a first contact profile associated with the contact name;
determine, from memory, a first characteristic of the first contact profile;
determine, based on the contact list, a second contact profile associated with the contact name;
determine, from memory, a second characteristic of the second contact profile;
determine, based on the first characteristic, that the first contact profile is associated as a first preferred contact profile for communicating with the contact name; and
select, based on the second characteristic, the second contact profile.

15. The system of claim 14, wherein the processor is further operable to:
determine, from memory, a third characteristic of the first contact profile;
determine that the first request is to communicate via a first communication mode;
determine, based on the second characteristic and the third characteristic, that the first contact profile lacks a capability to communicate using the first communication mode, and that the second contact profile includes the capability to communicate using the first communication mode; and
send instructions to a first device to send the first communication from the first device to the second device via the first communication mode.

16. The system of claim 14, wherein the processor is further operable to:
determine a user profile associated with the user account;
determine, based on the contact list, a third contact profile associated with the contact name;
determine a third characteristic of the third contact profile;
determine a fourth characteristic of the first contact profile;
determine, based on the fourth characteristic, that the first preferred contact profile lacks an assignment with the user profile;
determine, based on the second characteristic, that the second contact profile is assigned to the user profile;

determine, based on the third characteristic, that the third contact profile is assigned to the user profile;
generate first output data representing a request for a selection between the second contact profile and the third contact profile;
send the first output data to a first device for presentation;
receive, from the first device, second input data representing a selection of the second contact profile; and
send instructions to the first device to send a first communication from the first device to a second device associated with the second contact profile based on the selection.

17. The system of claim 14, wherein the processor is further operable to:
select, prior to selecting the second contact profile, the first contact profile;
generate, based on selecting the first contact profile, first output data indicating that the first contact profile has been selected;
send the first output data to a first device for presentation; and
determine an occurrence of an intervening event, wherein the intervening event comprises receiving second input data representing a second request to cancel the first request.

18. The system of claim 17, wherein the processor is further operable to:
receive third input data representing a third request to communicate with the contact name;
determine that the third request was made within a predetermined time interval with respect to the first request;
determine the contact list; and
select the second contact profile based on determining that the third request was made within the predetermined time interval.

19. The system of claim 17, wherein the processor is further operable to:
determine a condition at which the first request was made; and
store, in memory, instructions to remove the first preferred contact profile from consideration from communicating with the contact name, and to select the second contact profile for communicating with the contact name whenever the condition is met.

20. The system of claim 17, wherein the processor is further operable to:
determine that the intervening event has occurred a predefined number of times in a predefined manner; and
delete, from memory, an association of the first contact profile as the first preferred contact.

21. The system of claim 14, wherein the processor is further operable to: store, in memory, instructions indicating that the second contact profile is a second preferred contact profile.

22. The system of claim 14, wherein the processor is further operable to:
determine that the second characteristic satisfies a condition; and
select the second contact profile further based at least in part on the second characteristic satisfying the condition.

* * * * *